United States Patent
Morishima et al.

(10) Patent No.: US 8,144,185 B2
(45) Date of Patent: Mar. 27, 2012

(54) COMMUNICATION CONTROL METHOD, COMPUTER SYSTEM, CONFERENCE MANAGEMENT SERVER, COMMUNICATION METHOD AND PORTABLE TERMINAL

(75) Inventors: Hisayuki Morishima, Kawasaki (JP); Toru Noda, Kawasaki (JP); Akinobu Toda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1085 days.

(21) Appl. No.: 12/068,516

(22) Filed: Feb. 7, 2008

(65) Prior Publication Data

US 2008/0136897 A1    Jun. 12, 2008

Related U.S. Application Data

(63) Continuation of application No. PCT/JP2005/014925, filed on Aug. 15, 2005.

(51) Int. Cl.
*H04N 7/14* (2006.01)
(52) U.S. Cl. ............... 348/14.08; 348/14.01; 348/14.02
(58) Field of Classification Search .... 348/14.01–14.16; 709/204; 370/260, 261
See application file for complete search history.

(56) References Cited

U.S. PATENT DOCUMENTS

| | | | |
|---|---|---|---|
| 7,233,589 B2 | 6/2007 | Tanigawa et al. | |
| 7,359,497 B2 | 4/2008 | Morishima et al. | |
| 2004/0193686 A1 | 9/2004 | Blagsvedt et al. | |
| 2004/0260948 A1 | 12/2004 | Miyata et al. | |
| 2006/0035630 A1* | 2/2006 | Morishima et al. | 455/416 |

FOREIGN PATENT DOCUMENTS

| | | |
|---|---|---|
| FR | 2849974 | 7/2004 |
| JP | 2003-298751 | 10/2003 |
| JP | 2005-038393 | 2/2005 |
| WO | 02093959 | 11/2002 |
| WO | 03084258 | 10/2003 |
| WO | 2004004139 | 8/2004 |
| WO | 2007-020685 | 2/2007 |

OTHER PUBLICATIONS

Chinese Patent Office Action issued Apr. 17, 2009 in Chinese Patent Application 200580050959.5.
European Search Report based on EP 05780235 (dated Feb. 3, 2009).

(Continued)

*Primary Examiner* — Melur Ramakrishnaiah
(74) *Attorney, Agent, or Firm* — Murphy & King, P.C.

(57) ABSTRACT

A computer system has a presence server having a presence management unit that carries out a processing associated with presence data; and a conference management server that carries out a control processing of a conference. Then, when a request of an image delivery to another participant of a voice-based teleconference is received from a terminal of a first participant of the voice-based teleconference, the conference management server secures a resource for the image delivery, and transmits a presence setting request to the presence server so that the first participant and another participant can subscribe data concerning the resource for the image delivery. In addition, in response to the presence setting request, the presence management unit of the presence server carries out a setting so that the first participant and another participant can subscribe the data concerning the resource for the image delivery as presence data, which is delivered to subscribers when updated.

2 Claims, 21 Drawing Sheets

OTHER PUBLICATIONS

Schulsrinne Columbia U V Gubrani Lucent P Kyzivat J Rosenberg Cisco H: "RPID: Rich Presence Extensions to the Presence Information Data Format (PDIF); draft-itef-simple-rpid-06.txt" ITEF Standard-Working-Draft, Internet Engineering Task Force, IETF, CH, vol. somple, No. 6, (Jun. 2, 2005) XP015040719 ISSN: 0000-0004.
Japanese Notice of Allowance dated Mar. 15, 2011 for application No. 2007-530869.
Shimomura Michio, et al.; "A Proposal of Service for Communication Activation, Presence Club" Proceeding of IEICE General Conference 2003, Communication 2, The Institute of Electronics, Information and Communication Engineers, pp. 184.
Inoue Terumi, et al.; "Push-Type Information Distribution Software, "FLAIRINC" for Presence Services"; Fujitsu, vol. 54, No. 2, ISSN: 0016-2515, pp. 161-166.

* cited by examiner

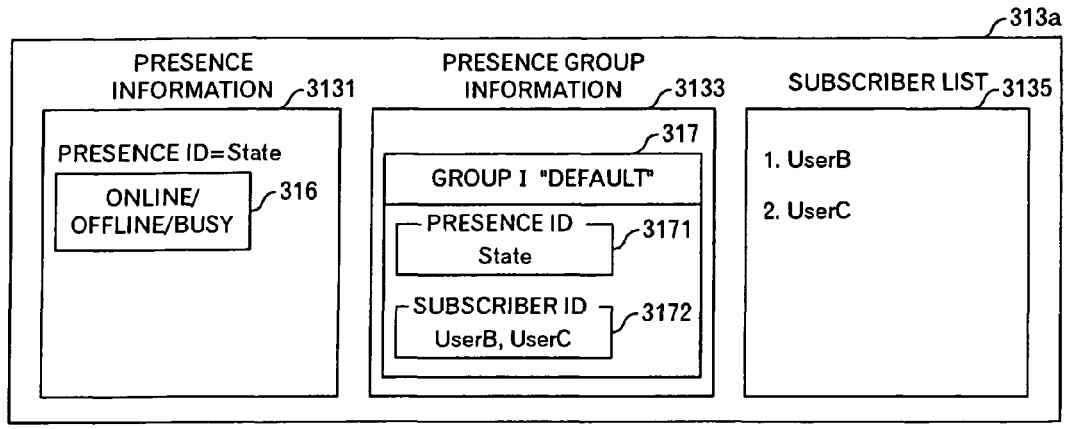

FIG.5

```
presenceID=FloorUser
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=speaker>
    <status>
       <basic>open</basic>
    </status>
    <contact> </contact>
   <note>UserA@poc.fj.com</note>
 </tuple>
</presence>
```

FIG.7

```
presenceID=JoinUser
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=join>
    <status>
       <basic>open</basic>
    </status>
    <contact> </contact>

<note>UserA@poc.fj.com,UserB@poc.fj.com</note>
 </tuple>
</presence>
```

FIG.8

```
presenceID=Member
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=member>
     <status>
          <basic>open</basic>
     </status>
     <contact> </contact>

<note>UserA@poc.fj.com,UserB@poc.fj.com,UserC@poc.fj.com</note>
 </tuple>
 </presence>
```

FIG.9

```
presenceID=ChatUser
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=chatuser>
     <status>
          <basic>open</basic>
     </status>
     <contact> </contact>

<note>UserA@poc.fj.com,UserB@poc.fj.com</note>
 </tuple>
 </presence>
```

FIG.10

```
presenceID=Chat
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=chatuser>
     <status>
          <basic>open</basic>
     </status>
     <contact> </contact>
    <note>Hello・・・</note>
 </tuple>
 </presence>
```

FIG.11

```
presenceID=PhotoUser
<presence xmlns="urn:ietf:params:xml:ns:cpim-pidf"
 xmlns:fjext="urn:xmlns-fj-com:flc2002-09:pidf-
status"
 entity= "pres:Conference01@poc.fj.com">
  <tuple id=photouser>
      <status>
           <basic>open</basic>
        </status>
     <contact></
   contact>

<note>UserA@poc.fj.com,UserB@poc.fj.com</note>
 </tuple>
 </presence>
```

FIG.12

```
presenceID=Photo
<presence xmlns="urn:ietf:params:xml:ns:cpim-pidf"
 xmlns:fjext="urn:xmlns-fj-com:flc2002-09:pidf-
status"
 entity= "pres:Conference01@poc.fj.com">
  <tuple id=photouser>
      <status>
           <basic>open</basic>
        </status>
     <contact></
   contact>
     <note> xxx.xxx.xxx.xxx : xxxx  </note>
 </tuple>
 </presence>
```

FIG.13

COMMUNICATION CONTROL METHOD, COMPUTER SYSTEM, CONFERENCE MANAGEMENT SERVER, COMMUNICATION METHOD AND PORTABLE TERMINAL

CROSS-REFERENCE TO RELATED APPLICATIONS

This application is a continuation, filed under 35 U.S.C. section 111(a), of International Application PCT/JP2005/014925, was filed Aug. 15, 2005.

TECHNICAL FIELD OF THE INVENTION

This invention relates to a communication control technique in a teleconference.

BACKGROUND OF THE INVENTION

For example, JP-A-2003-298751 discloses a technique to realize a group call among three or more persons in an existing telephone system without a large technical change of a switch and/or a repeater, which constitute the telephone system. That is, the technique includes a step of registering a caller information including a user ID, a telephone number and a password of the caller, and telephone numbers of a plurality of calling destination receivers for which the caller desires to call into a telephone directory database connected to a communication network in advance; a step of selecting the calling destination receiver of the caller, which is registered in the telephone directory database, by accessing to the telephone directory database by the caller; a step of transmitting, by the telephone directory database, the telephone number of the caller and the telephone number of the calling destination receiver selected by the caller to a call center having simultaneous line connection means; and a step of simultaneously calling, by the call center, to the telephone number of the caller and the telephone number of the calling destination receiver selected by the caller through the simultaneous line connection means, and it is possible for the caller to simultaneously call with the plurality of selected calling destination receivers. However, an idea to change a communication mode of the conference on the way is not disclosed.

In addition, U.S. Pat. No. 7,233,589 discloses a technique, which applies the instance messaging (IM) technique to a teleconference. Specifically, presence information of each IM client, usable media and user information are managed by an IM server, and each IM client can obtain such information. When carrying out a text chat, the IM server manages the connection between each participating IM client and the IM server, and merges text data from each participating IM client to deliver the merged result to each participating IM client. When carrying out a voice chat, an AP server manages the connection between each participating IM client and an MD server, and the MD server mixes the voice from each participating IM client except a target IM client to deliver the mixed result to the target IM client. This processing is carried out for each participating IM client. However, this publication only indicates a typical usage method of the presence technique (a usage method of indicating states of clients such as off-line or during IM), and there is no special usage method of the presence data.

Recently, a technique (PoC system) of carrying out a teleconference by using portable terminals such as cellular phones comes to be proposed. During such a teleconference, it may be desirable that the teleconference is carried out while referring to image data with the participants. Moreover, it may be desirable that the reference authority to the image data is limited to some members of the conference participants.

SUMMARY OF THE INVENTION

Therefore, an object of this invention is to provide a technique of easily enabling the communication of image data and the like during a teleconference in the teleconference in which portable terminals are used.

A communication control method according to a first aspect of this invention is executed by a conference management server, and includes a step of receiving, from a terminal of a first participant of a voice-based teleconference, image delivery request to another participant in the voice-base teleconference by the first participant; and a setting step of causing a presence server to carry out a presence management setting so that the first participant and another participant can subscribe data concerning image delivery, wherein the data concerning the image delivery is managed as presence data, which is delivered when updated.

Thus, because the data concerning the image delivery is managed as the presence data, an image can be delivered to the participants of the voice-based teleconference by using the presence technique.

In addition, the first aspect of this invention may further include: a step of receiving image data from the terminal of the first participant, and storing the image data into a data storage area for the image delivery; and a step of causing the presence server to carry out an update setting of the presence data of the first participant in response to receipt of the image data. Because, by changing the presence data of the first participant to, for example, "in image delivery", the presence data is automatically delivered to other participants, other participants can know a transmission and receipt state of the image data by the first participant.

Furthermore, the aforementioned data concerning the image delivery may include identification information of a user relating to the image delivery and data concerning an image delivery resource. Not only the identification information of the user and but also the image delivery state of the user may be included. In addition, the image delivery resource may be an IP address and a port number.

Furthermore, the aforementioned setting step may include: a step of requesting the presence server to register the data concerning the image delivery as the presence data; and a step of requesting the presence server to disclose the data concerning the image delivery as the presence data. By carrying out such a processing, it is possible to easily and flexibly set the delivery destination of the data concerning the image delivery.

Furthermore, the first aspect of this invention may further include: a step of receiving the image data from the first participant, and storing the image data into the data storage area for the image delivery; and in response to receipt of the image data, a step of causing the presence server to carry out an update setting of the presence data including the data concerning the image delivery. For example, by including data representing the completion of the image upload by the delivery requester into the data concerning the image delivery, it is possible for other participant to know the transmission and receipt state of the image data by the first participant.

Moreover, another participant may be a subset of participants of the voice-based teleconference, wherein the subset is designated by the first participant of the voice-based teleconference. Furthermore, a plurality of sets of the presence data including the data concerning the image delivery may be managed for one voice-based teleconference.

A computer system according to a second aspect of this invention has a presence server having presence management means for carrying out a processing associated with presence data; and a conference management server that carries out a control processing of a conference. Then, when a request of an image delivery to another participant of a voice-based teleconference is received from a terminal of a first participant of the voice-based teleconference, the conference management server secures a resource for the image delivery, and transmits a presence setting request to the presence server so that the first participant and another participant can subscribe data concerning the resource for the image delivery. In addition, in response to the presence setting request, the presence management means of the presence server carries out a setting so that the first participant and another participant can subscribe the data concerning the resource for the image delivery as presence data, which is delivered to subscribers when updated.

A portable terminal according to a third aspect of this invention has a presence data processor that receives data concerning a resource for image data delivery, wherein the data concerning the resource for the image data delivery is delivered from a server when image data has been stored from a terminal of a first participant of a voice-base teleconference to the server and is managed as presence data, which is delivered to subscribers when updated; and an image processor that obtains the image data from the resource for the image data delivery by using the data concerning the resource for the image data delivery after the receipt. Even by the portable terminal, it becomes possible to carry out the communication of the image data during the teleconference.

A portable terminal according to a fourth aspect of this invention has a presence data processor that receives information concerning a resource for image data delivery, wherein the information concerning the resource for the image data delivery is delivered from a server when the server receives an image delivery request from a terminal of a first participant of a voice-based teleconference and is managed as first presence data, which is delivered to subscribers when updated, and receives second presence data concerning a state of the first participant, wherein the second presence data is delivered by the server when image data corresponding to the image delivery request has been stored from the terminal of the first participant to the server; and an image processor that obtains the image data from the resource for the image data delivery by using the data concerning the resource for the image data delivery, which is included in the first presence data, after the second presence data is received.

Incidentally, it is possible to create a program for causing a computer to execute the aforementioned communication control method, a program for causing the conference management server or the presence server to execute the aforementioned processing and a program for causing the portable terminal to carry out the aforementioned operation. The programs are stored into a storage medium or a storage device such as, for example, a flexible disk, a CD-ROM, a magneto-optical disk, a semiconductor memory, or a hard disk. In addition, the programs may be distributed as digital signals over a network in some cases. Data under processing is temporarily stored in the storage device such as a computer memory.

BRIEF DESCRIPTION OF THE DRAWINGS

FIG. 5 is a schematic diagram of data stored in a presence data storage in the user A presence manager;

FIG. 7 is a diagram showing an example of presence data whose presence ID is "FloorUser";

FIG. 8 is a diagram showing an example of presence data whose presence ID is "JoinUser";

FIG. 9 is a diagram showing an example of presence data whose presence ID is "Member";

FIG. 10 is a diagram showing an example of presence data whose presence ID is "ChatUser";

FIG. 11 is a diagram showing an example of presence data whose presence ID is "Chat";

FIG. 12 is a diagram showing an example of presence data whose presence ID is "PhotoUser";

FIG. 13 is a diagram showing an example of presence data whose presence ID is "Photo";

DETAILED DESCRIPTION OF THE PREFERRED EMBODIMENTS

Figure 1:
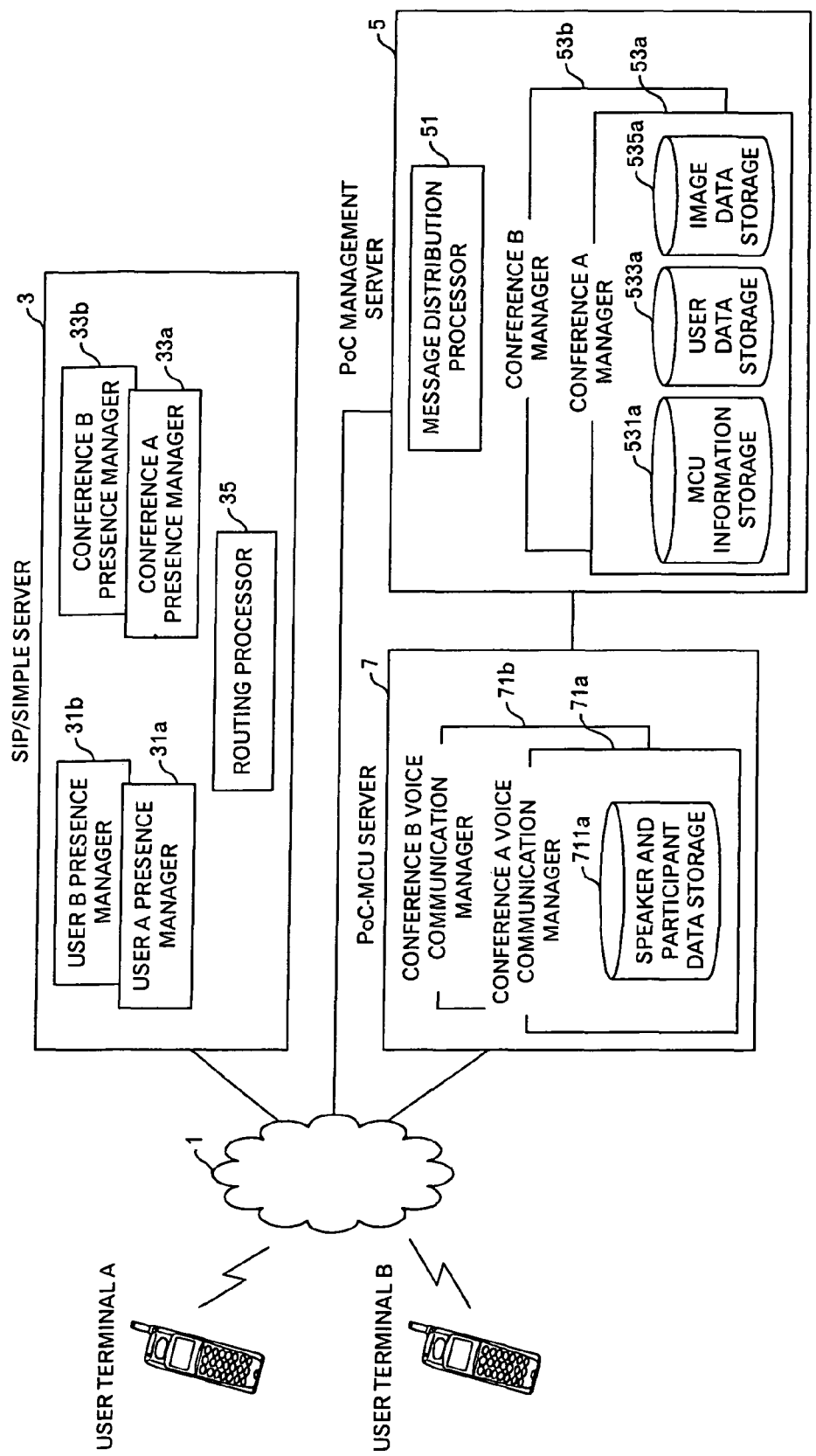
FIG. 1 is a system configuration diagram according to one embodiment of this invention.

FIG. 1 shows a system outline diagram according to one embodiment of this invention. A network 1 such as a cellular phone network is connected with plural cellular phones (here, a user terminal A operated by a user A, and a user terminal B operated by a user B) through wireless base stations not shown in the figure. The cellular phone may be a Personal Handyphone System (PHS) terminal, and not only has a voice call function, but also can execute various application programs such as a mail client, a web browser, a client application in this embodiment and the like. In addition, the user terminals A and B may be portable terminals such as a Personal Digital Assistant (PDA) with the voice call function. The user terminals A and B in this embodiment will be explained by using a functional block diagram later.

The network 1 is connected with a SIP/SIMPLE server 3 and a Push-to-talk over Cellular (PoC)-Multipoint Communication Unit (MCU) server 7. The SIP/SIMPLE server 3 and the PoC management server 5 may be one server computer having their functions.

The SIP/SIMPLE server 3 has a presence manager 31a of the user A, a presence manager 31b of the user B, a presence manager 33a of a conference A, a presence manager 33b of a conference B, and a routing processor 35. Here, in order to simplify the description, only the presence managers of the users A and B are shown. However, the presence managers of the number of users are provided. In addition, although only the presence managers of the conferences A and B are shown, the presence managers of the number of conferences are provided. Moreover, the SIP/SIMPLE server 3 includes processors not directly related to this embodiment such as processors carrying out a user authentication processing. However, they are not shown, here. The presence manager of the user and the presence manager of the conference will be explained by using functional block diagrams later.

The PoC management server 5 is also called a PoC control server, and is a server managing and controlling the teleconference, and includes conference managers 53 carrying out a processing for each conference (here, a conference A manager 53a carrying out a processing for the conference A, and a conference B manager 53b carrying out a processing for the conference B) and a message distribution processor 51 carrying out a distribution processing to transfer messages transferred from the routing processor 35 of the SIP/SIMPLE server 3 to a conference manager 53 in charge of the message. In addition, the conference manager 53 includes an MCU information storage 531 (here, a MCU information storage 531a of the conference A), a user data storage 533 (here, a user data storage 533a of the conference A), and an image data storage 535 (here, an image data storage 535a for the conference A). The image data storage 535a stores image data to be delivered to participants of the conference A. Thus, the PoC management server 5 also manages the image data to be delivered to the participants of the conference A.

In addition, the PoC-MCU server 7 includes a conference voice communication manager 71 that manages and controls the voice communication for each conference (here, a conference A voice communication manager 71a carrying out a processing for the conference A and a conference B voice communication manager 71b carrying out a processing for the conference B), and the conference voice communication manager 71 includes a speaker and participant data storage 711 (here, a speaker and participant data storage 711a of the conference A).

In FIG. 1, the user terminal communicates with the SIP/SIMPLE server 3 by SIMPLE (SIP (Session Initiation Protocol) for Instant Messaging and Presence Leveraging Extensions)/TCP through the network 1, and communicates with the PoC-MCU server 7 by RTP (Real-time Transport Protocol)/UDP through the network 1.

Figure 2:
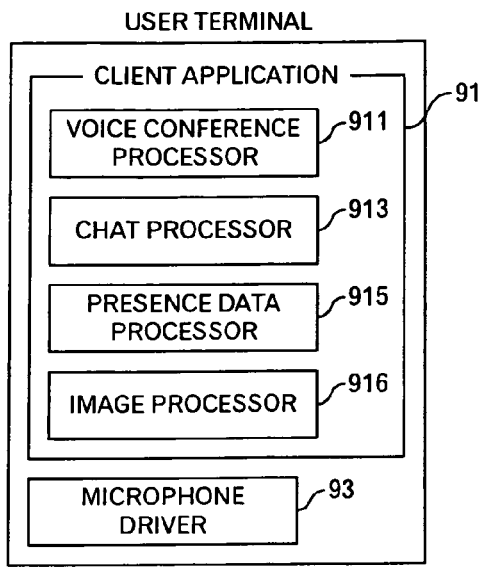
FIG. 2 is a functional block diagram of a user terminal.

Next, FIG. 2 shows a functional block diagram of the user terminal. The user terminal includes a client application 91 to carry out a processing in this embodiment, and a microphone driver 93 of a microphone provided in the user terminal. The client application 91 includes a voice conference processor 911, a chat processor 913, a presence data processor 915 and an image processor 916. The image processor 916 accepts an image delivery request from the user, requests the PoC management server 5 or the like to carry out necessary processing, transmits image data itself, and further receives the image data from the PoC management server 5 to display it on the display device. Incidentally, functions not directly related to this embodiment are not shown in this figure.

Figure 3:
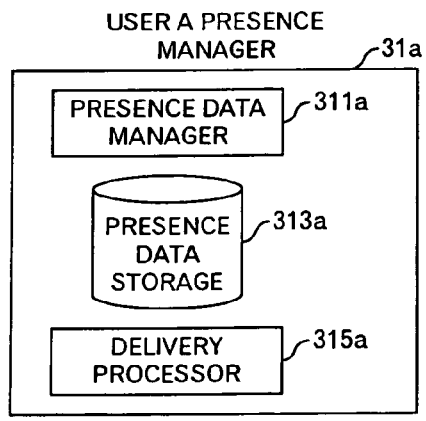
FIG. 3 is a functional block diagram of a user A presence manager.

In addition, FIG. 3 shows a functional block diagram of the presence manager 31a of the user A. The presence manager 31a of the user A includes a presence data manager 311a, a presence data storage 313a, and a delivery processor 315a. The presence manager 31a of the user A cooperates with the client application 91 of the user terminal A to update data stored in the presence data storage 313a, and carries out a delivery processing of the data stored in the presence data storage 313a.

Figure 4:
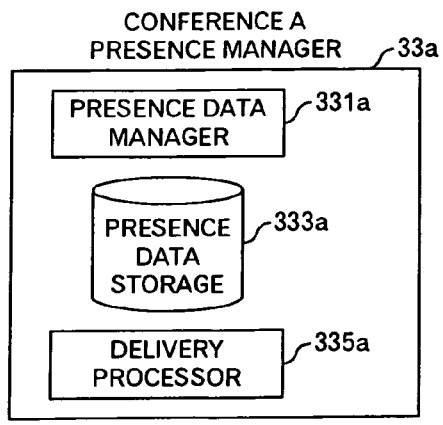
FIG. 4 is a functional block diagram of a conference A presence manager.

Furthermore, FIG. 4 shows a functional block diagram of the presence manager 33a of the conference A. The presence manager 33a of the conference A includes a presence data manager 331a, a presence data storage 333a, and a delivery processor 335a. The presence manager 33a of the conference A cooperates with the conference A manager 53 a of the PoC manager server 5 and the client application 91 of the user to update data stored in the presence data storage 333a, and carries out a delivery processing of the data stored in the presence data storage 333a.

FIG. 5 shows an example of data stored in the presence data storage 313a included in the user A presence manager 31a. In the example of FIG. 5, the presence data storage 313a includes a presence information storage area 3131, a presence group information storage area 3133, and a subscriber list storage area 3135. The presence information storage area 3131 is an area to store, for each presence data item, presence data (here, state information of the user or user terminal), and includes an area 316 to store the presence data (here, ONLINE, OFFLINE, or BUSY. However, other state (e.g. "during image delivering" or "Photo Sending") may be adopted.) whose presence ID, which is an ID of the presence data item, is "state". The number of presence data items is not limited, but only the presence data item showing the state of the user terminal is indicated in this embodiment. The presence group information storage area 3133 is an area to store data to associate the presence data item (i.e. presence ID) with the delivery destination user ID (i.e. subscriber ID). Here, it includes an area 317 including an area 3171 to store presence IDs that belong to a group I "default", which is a presence group, and an area 3172 to store user IDs (i.e. subscriber IDs). The default group is a group to which the subscriber is initially registered. The number of groups is not limited, and an arbitrary number of groups can be defined. Here, the user IDs (i.e. subscriber IDs) of the users for whom the information delivery is approved such as the user B and user C are registered in the subscriber list storage area 3135. The number of subscribers is not limited, and an arbitrary number of subscribers can be registered.

Figure 6:
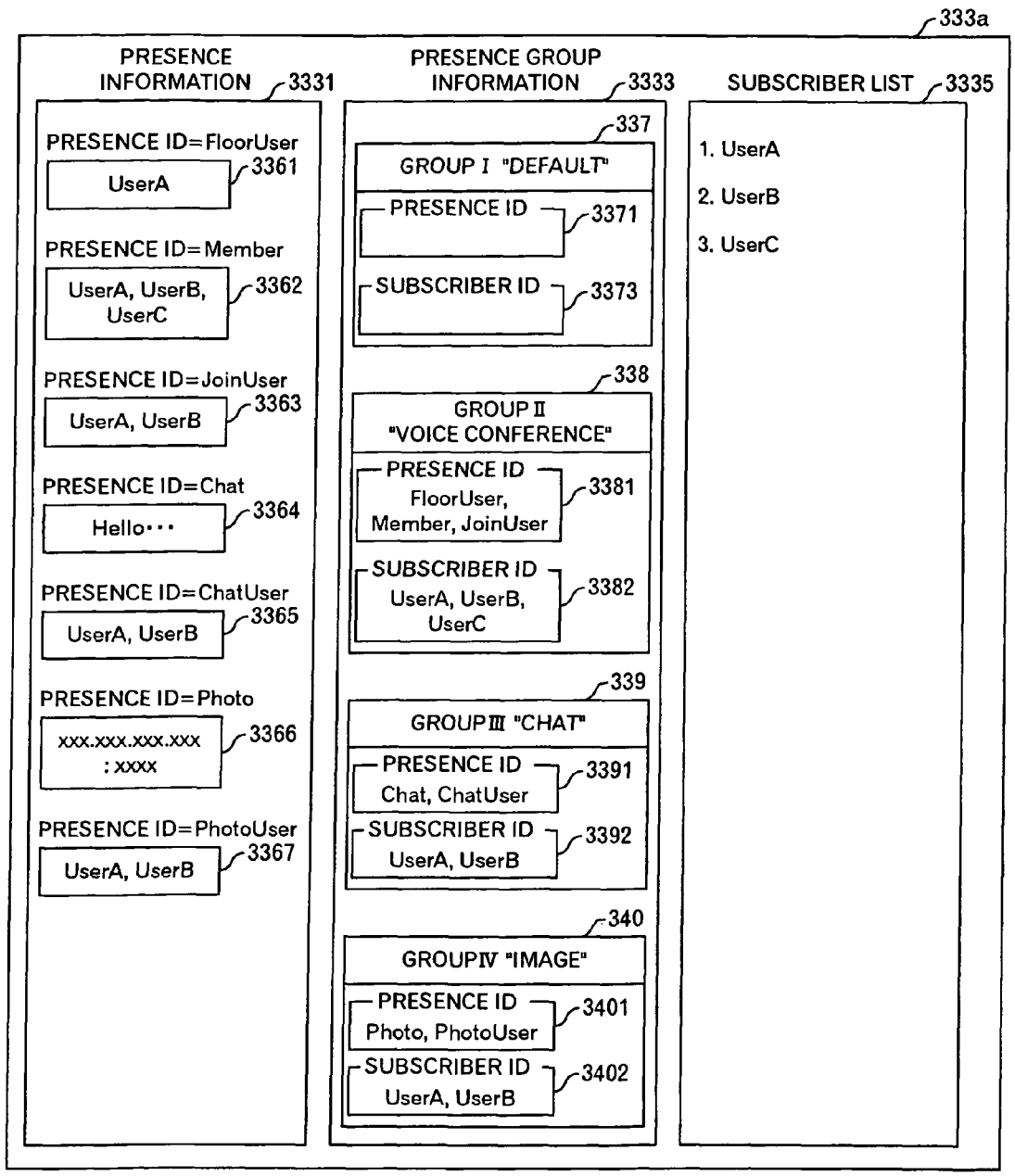
FIG. 6 is a schematic diagram of data stored in a presence data storage in the user A presence manager.
Figure 14:
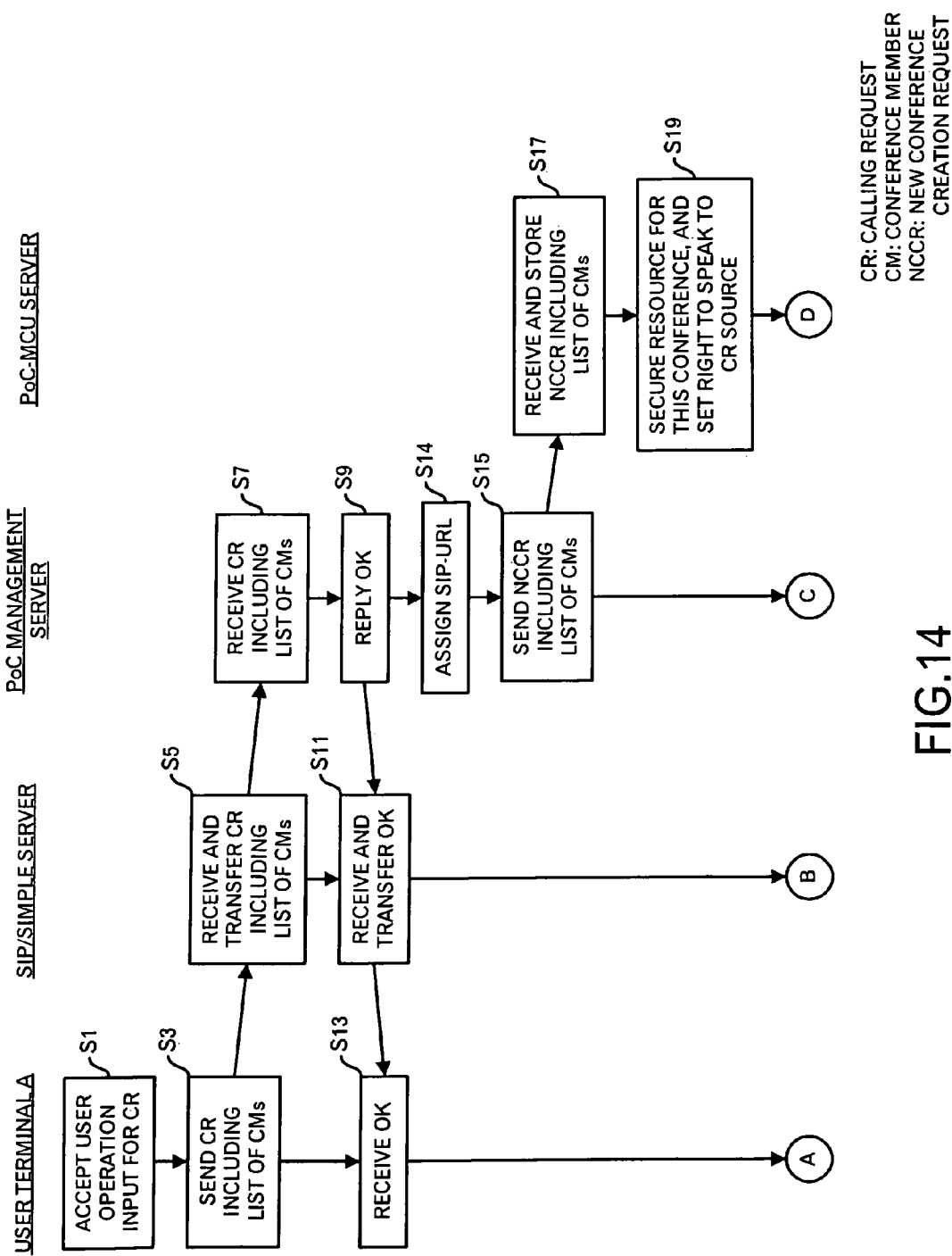
FIG. 14 is a diagram showing a first portion of a processing flow according to one embodiment of this invention.

In addition, FIG. 6 shows an example of data stored in the presence data storage 333*a* included in the conference A presence manager 33*a*. In the example of FIG. 6, the presence data storage 333*a* includes a presence information storage area 3331, a presence group information storage area 3333, and a subscriber list storage area 3335. The presence information storage area 3331 includes an area 3361 to store the presence data (here, subscriber ID of the user having a speaker right (also called a right to speak)) whose presence ID, which is an ID of the presence data item, is "FloorUser", an area 3362 to store the presence data (here, subscriber ID of the user called to the voice conference) whose presence ID, which an ID of the presence data item, is "Member", an area 3363 to store the presence data (here, subscriber ID of the user participating the voice conference) whose presence ID, which an ID of the presence data item, is "JoinUser", an area 3364 to store the presence data (here, argument contents of the chat (character-based teleconference) whose presence ID, which an ID of the presence data item, is "Chat", an area 3365 to store the presence data (here, subscriber ID of the participating user of the chat) whose presence ID, which an ID of the presence data item, is "ChatUser", an area 3366 to store the presence data (here, an upload destination resource of image data to be delivered to designated users and/or a delivery source resource (e.g. IP address xxx.xxx.xxx.xxx and port number xxxx), whose presence ID, which an ID of the presence data, is "Photo" and an area 3367 to store the presence data (here, subscriber IDs of the image delivery destination users) whose presence ID, which is an ID of the presence data, is "PhotoUser".

In this embodiment, as for the presence data whose presence IDs are "Member", "JoinUser", "ChatUser" and "PhotoUser", only subscriber IDs are notified, and the states of the user of the subscriber IDs are not notified. However, in addition to the subscriber IDs, the state data (e.g. "in the writing", "in the image delivery" or the like) may be additionally registered to change the display for the users in the user terminal. For example, "in the writing" mark may be added or the state may be changed to "in the image delivery". Furthermore, as for the presence data whose presence ID is "Photo", in order to deal with a case where plural users deliver the image, the upload destination resource and the delivery source resource may be registered. For example, xxx.xxx.xxx.xxx:xxxx is registered as the upload destination resource, and plural addresses such as ftp://yyy.yyy.yyy.yyy/imagefromUserA-.jpg and ftp://yyy.yyy.yyy.yyy/imagefromUserB.gif may be included. Furthermore, although the name of the transmission source user is included in the file name in the above example, information to identify the delivery source user may be registered separately from the address. Moreover, if necessary, the presence data representing the state may be registered. Incidentally, it may be impossible to simultaneously deliver plural image files.

In addition, the presence group information storage area 3333 includes an area 337 including an area 3371 to store presence IDs belonging to a group I "default", which is a presence group, and an area 3373 to store user IDs (i.e. subscriber IDs), an area 338 including an area 3381 to store presence IDs belonging to a group II "voice conference", which is a presence group, and an area 3382 to store user IDs (i.e. subscriber IDs), an area 339 including an area 3391 to store presence IDs belonging to a group III "chat", which is a presence group, and an area 3392 to store user IDs (i.e. subscriber IDs), an area 340 including an area 3401 to store presence IDs belonging to a group IV "Image", which is a presence group, and an area 3402 to store user IDs (i.e. subscriber IDs).

The subscriber IDs of the users who participate in the voice conference are stored in the are 3382, and data disclosed to the users who participate in the voice conference is the presence data whose presence IDs are "FloorUser", "Member" and "JoinUser". That is, the subscriber ID of a person who has the right to speak, a list of the subscriber IDs of the called users, and a list of the subscriber IDs of the participating users. In addition, the subscriber ID of the user participating in the chat is stored in the area 3392, and data disclosed to the users who participate in the chat is the presence data whose presence IDs are "Chat" and "ChatUser". That is, the list of the subscriber IDs of the chat participants and the argument contents of the chat are presented. In addition, the subscriber IDs of the users participating the image delivery are stored in the area 3402, and data disclosed to the users participating in the image delivery is the presence data whose presence ID is "Photo" and the presence data whose presence ID is "PhotoUser". That is, a list of the subscriber IDs of the participants in the image delivery and the upload destination resource (IP address and port number) and/or the delivery source resource are presented. The user IDs (i.e. subscriber IDs) of the users for whom the information delivery is approved such as the user A, user B and user C are registered in the subscriber list storage area 3335.

Incidentally, the users who are delivery destinations of the image data may be some or all of the users participating in the voice conference. When all users participating in the voice conference are delivery destinations, the presence data whose presence ID is "JoinUser" may be used without providing the area 3367 to store the presence data whose presence ID is "PhotoUser". That is, "Photo" and "JoinUser" may be registered in the area 3401 to store the presence IDs belonging to the group IV "Image".

The presence data whose presence ID is "Chat" and the presence data whose presence ID is "ChatUser" in the presence information storage area 3331 correspond to the group III "chat" 339 of the presence group information storage area 3333, and it is also possible to provide plural sets of a data area of a group associated with the chat such as the group III "chat" and a group IV "chat", an area, which corresponds to the data area, to store the subscriber IDs of the participating users of the chat and an area, which corresponds to the data area, to store the chat contents in the respectively distinguishable form in the presence data storage 333*a* for one conference. This is similar in the image delivery, and it is also possible to provide plural sets of a data area of a group associated with the image delivery such as the group III "Image" and a group IV "Image", an area, which corresponds to the data area, to store the subscriber IDs of the participating users of the image delivery and an area, which corresponds to the data area, to store the resource for the image delivery in the respectively distinguishable form in the presence data storage 333*a* for one conference.

FIGS. 5 and 6 schematically show data stored in the presence data storage, and for example, data of the tag data structure as shown in FIG. 7 is stored in the area 3361 for the presence data whose presence ID is "FloorUser", for example. The example of FIG. 7 is described by using XML (eXtensible Markup Language) basically in conformity with OMA (Open Mobile Alliance). Here, a point to which an attention should be paid is a point that an owner of the presence data whose presence ID is "FloorUser" is identified by SIP-URL (Uniform Resource Locator) as Conference01@poc.fj.com in a phrase "entity="pres:

Conference01@poc.fj.com" of the fourth line from the top. Here, the owner of this presence data is the conference A manager 53a of the PoC management server 5, and this presence data is updated by the conference A manager 53a. In addition, the SIP-URL of the conference A manager 53a is "Conference01@poc.fj.com". Furthermore, the SIP-URL "UserA@poc.fj.com" is registered as the user ID of a holder of the right to speak, between tags <note> and </note>. In FIGS. 5 and 6, in order to simply indicate "UserA@poc.fj.com", "UserA" is indicated.

Similarly, data having the tag data structure as shown in, for example, FIG. 8 is stored in the area 3363 for the presence data whose presence ID is "JoinUser". In the example of FIG. 8, similarly to FIG. 7, the owner of this presence data is identified by the SIP-URL "Conference01@poc.fj.com", and the SIP-URLs "UserA@poc.fj.com, UserB@poc.fj.com" of the participants of the voice conference are registered as the user IDs, between the tags <note> and </note>.

Furthermore, data of the tag data structure as shown in, for example, FIG. 9 is stored in the area 3362 for the presence data whose presence ID is "Member". In the example of FIG. 9, similarly to FIG. 7, the owner of this presence data is identified by the SIP-URL "Conference01@poc.fj.com", and the SIP-URLs "UserA@poc.fj.com, UserB@poc.fj.com, UserC@poc.fj.com" of the users called into the voice conference are registered as the user IDs, between the tags <note> and </note>.

In addition, data of the tag data structure as shown in, for example, FIG. 10 is stored in the area 3365 for the presence data whose presence ID is "ChatUser". In the example of FIG. 10, similarly to FIG. 7, the owner of this presence data is identified by the SIP-URL "Conference01@poc.fj.com", and the SIP-URLs "UserA@poc.fj.com, UserB@poc.fj.com" of the users participating in the chat are registered as the user IDs, between the tags <note> and </note>.

Furthermore, data of the tag data structure as shown in, for example, FIG. 11 is stored in the area 3364 for the presence data whose presence ID is "Chat". In the example of FIG. 11, similarly to FIG. 7, the owner of this presence data is identified by the SIP-URL "Conference01@poc.fj.com", and the argument contents "Hello . . . " in the chat are registered between the tags <note> and </note>. Incidentally, the owner of this presence data is the conference A manager 53a, and it is the same as that of the aforementioned other presence data. However, it is assumed that a setting is carried out so as to give the right to update to the users whose user IDs are stored in the area 3365 for the presence data whose presence ID is "ChatUser".

In addition, the data of the tag data structure as shown in, for example, FIG. 12 is stored in the area 3367 for the presence data whose presence ID is "PhotoUser". In the example of FIG. 12, similar to FIG. 7, the owner of this presence data is identified by SIP-URL as Conference01@poc.fj.com, and SIP-URLs "UserA@poc.fj.com, UserB@poc.fj.com" of the users participating in the image delivery are registered, as the user IDs, between a <note> tag and a </note> tag.

Furthermore, the data of the tag data structure as shown in FIG. 13 is stored in the area 3366 for the presence data whose presence ID is "Photo". In the example of FIG. 13, similar to FIG. 7, the owner of this presence data is identified by SIP-URL as Conference01@poc.fj.com, and the upload destination resource (IP address and port number) of the image and/or delivery source resource are registered between <note> tag and </note> tag. In addition, as described above, it is possible to register much more data to notify much more data to participants in the image delivery.

The presence data is basically updated by the owner, and when updated, the delivery processor delivers the presence data to users of user IDs associated with the presence ID of the presence data. In addition, the conference A manager 53a and the conference B manager 53b of the PoC management server 5 may have a supervisor authority for the presence data in the SIP/SIMPLE server 3 to change the necessary presence data at any time.

Next, a processing flow of the system shown in FIGS. 1 to 4 will be explained by using FIGS. 14 to 29. Incidentally, all of the users have logged into the SIP/SIMPLE server 3, and have been authenticated. Furthermore, an IP address of the user terminal has been associated with the user ID (SIP-URL) in the SIP/SIMPLE server 3. First, the user A operates the user terminal A to input a call instruction by designating members to be called into the voice-based teleconference in order to start the conference. The voice conference processor 911 of the client application 91 in the user terminal A accepts the user operation input for the calling instruction of the members to be called into the voice-based teleconference (step S1), and transmits a calling request including a list of conference members (e.g. a list of SIP-URLs) to the SIP/SIMPLE server 3 (step S3). The routing processor 35 of the SIP/SIMPLE server 3 receives the calling request including the list of the conference members from the user terminal A, and transfers the request to the PoC management server 5 when it is judged to be the calling request (step S5). The message distribution processor 51 of the PoC management server 5 receives the calling request including the list of the conference members from the routing processor 35 of the SIP/SIMPLE server 3 (step S7). In response to this receipt, the message distribution processor 51 of the PoC management server 5 replies an OK response (step S9). When receiving the OK response from the PoC management server 5, the routing processor 35 of the SIP/SIMPLE server 3 transfers the OK response to the user terminal A (step S11). The user terminal A receives the OK response from the SIP/SIMPLE server 3 (step S13). This enables the user terminal A to recognize the calling request is received by the PoC management server 5.

When receiving the calling request including the list of the conference members, the message distribution processor 51 of the PoC management server 5 newly activates the conference manager 53 (e.g. newly activates the conference A manager 53a) because the new conference is carried out, and assigns the SIP-URL to the conference A manager 53a (step S14). The conference A manager 53a stores the list of the conference members into the user data storage 533a, and transmits a new conference creation request including the list of the conference members to the PoC-MCU server 7 (step S15). In addition, the list of the conference members includes the user ID of the calling request source user and the IP address of that user terminal, and the user is identified as the holder of the right to speak.

When receiving the new conference creation request including the list of the conference members, the PoC-MCU server 7 newly activates the conference voice communication manager 71 (e.g. the conference A voice communication manager 71a) in order to secure the resources for the new conference. Then, the conference A voice communication manager 71a stores the list of the conference members into the speaker and participant data storage 711a (step S17). Incidentally, the conference A voice communication manager 71a holds the SIP-URL of the conference A manager 53a, and thereby it becomes possible to respond to an instruction from the conference A manager 53a. Then, the conference A voice communication manager 71a secures the resources used in the conference relating to the calling request, that is, the IP address, the port number and the like, and further sets the right to speak to the calling request source user (step S19). As for the user having the right to speak, data is held in the speaker and participant data storage 711a in the distinguishable form. In this embodiment, only the person who has the right to speak can cause the PoC-MCU server 7 to transfer the voice data to the other participants. After this, the processing shifts to a processing of FIG. 15 through terminals A to D. Incidentally, the IP address of the user terminal of the calling request source user is registered in the speaker and participant data storage 711a at this stage.

Figure 15:
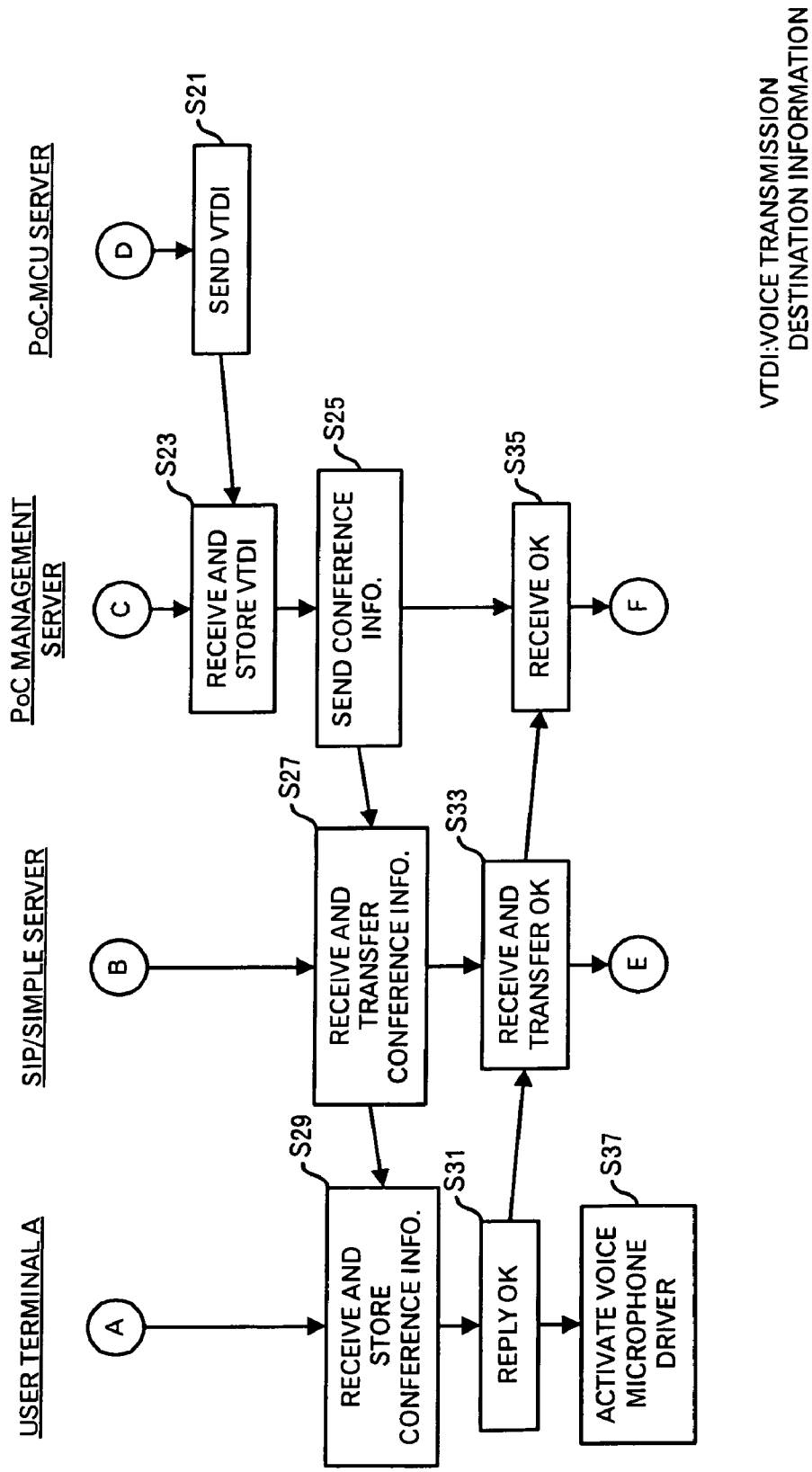
FIG. 15 is a diagram showing a second portion of the processing flow according to one embodiment of this invention.

The processing subsequent to the terminals A to D will be explained by using FIG. 15. The conference A voice communication manager 71a of the PoC-MCU server 7 transmits the IP address and the port number that are the resources secured at the step S19, as the voice transmission destination information, to the PoC management server 5 (step S21). The conference A manager 53a of the PoC management server 5 receives the voice transmission destination information from the PoC-MCU server 7, and stores the information into the MCU information storage 531a (step S23). Then, the conference A manager 53a uses data stored in the MCU information storage 531a to transmit the voice transmission destination information (the IP address and the port number of the PoC-MCU server 7) and the SIP-URL of the conference A manager 53a, as the conference information, to the SIP/SIMPLE server 3 (step S25). When receiving the conference information from the PoC management server 5, the routing processor 35 of the SIP/SIMPLE server 3 transfers the conference information to the user terminal A of the calling request source (step S27). Incidentally, at this timing, the presence manager (here, the conference A presence manager 33a) of the conference may be activated based on the received conference information.

The voice conference processor 911 of the client application 91 in the user terminal A receives the conference information from the SIP/SIMPLE server 3, and stores the information into a storage device (step S29). The voice conference processor 911 replies an OK response to the SIP/SIMPLE server 3 (step S31). When receiving the OK response from the user terminal A, the routing processor 35 of the SIP/SIMPLE server 3 transfers the OK response to the PoC management server 5 (step S33). The conference A manager 53a of the PoC management server 5 receives the OK response from the SIP/SIMPLE server 3 (step S35). Incidentally, the message distribution processor 51 receives a message (here, the OK response) from the SIP/SIMPLE server 3, and transfers the message to the conference A manager 53a in charge of the message. However, in the following explanation, the explanation for the receipt of the message distribution processor 51 is omitted.

In addition, in response to the receipt of the conference information, the voice conference processor 911 of the client application 91 in the user terminal A activates the microphone driver 93 (step S37). That is, the microphone of the user terminal A detects the voice of the user A, and converts it into electrical signals, and the microphone driver 93 generates voice packets in order to transmit the voice received by the microphone. Thus, the user terminal A can transmit the voice packets to the PoC-MCU server 7 according to the IP address and the port number, which are included in the received conference information. However, even when the voice packets are transmitted to the PoC-MCU server 7 at this stage, other participants are not identified. Therefore, the PoC-MCU server 7 never copies and transfers the voice packets. The processing shifts to a processing of FIG. 16 through terminals E and F.

Figure 16:
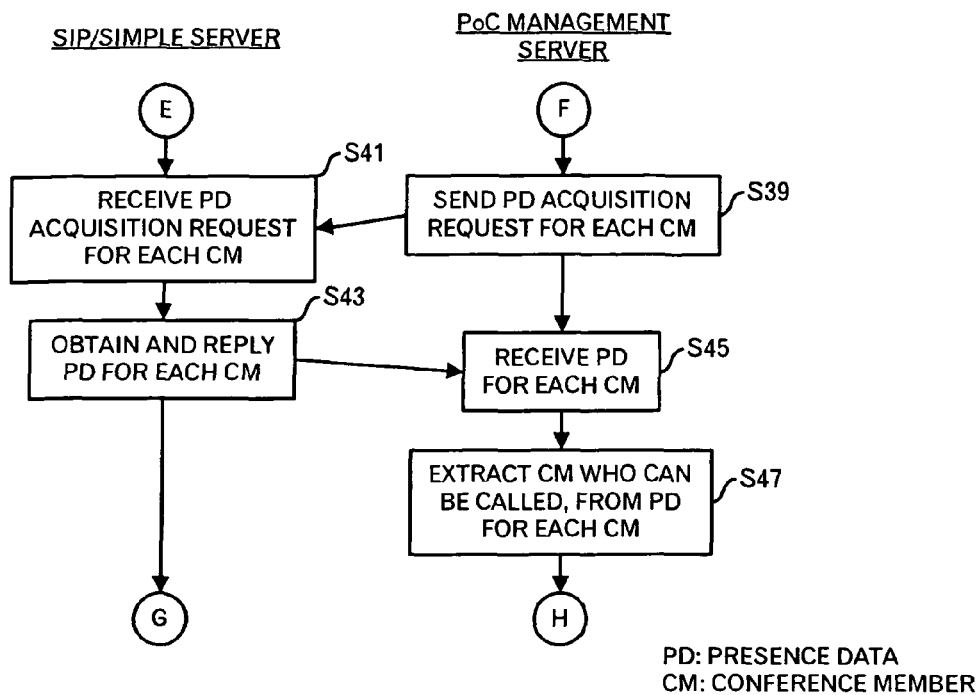
FIG. 16 is a diagram showing a third portion of the processing flow according to one embodiment of this invention.

Next, the processing subsequent to the terminals E and F will be explained by using FIG. 16. The conference A manager 53a of the PoC management server 5 uses the data stored in the user data storage 533a to transmit a presence data acquisition request of each conference member except the calling request source (step S39). The presence data acquisition request is transmitted for each conference member. The presence manager 31 of each conference member in the SIP/SIMPLE server 3 receives the presence data acquisition request of each conference member from the PoC management server 5 (step S41). Normally, only the user can update his or her presence data, and persons who are allowed by the user can subscribe the presence data. Therefore, the PoC management server 5 cannot normally obtain the presence data of the conference members. However, the presence data manager 311 is set in advance so as to enable to refer to the presence data without the subscription approval when the request is received from the PoC management server 5. Or, it is possible to give the supervisor authority to the PoC management server 5 for the presence data in the SIP/SIMPLE server 3, as described above. Therefore, the presence data manager 311 of the presence manager 31, which received the presence data acquisition request, reads out the presence data representing the state of the user or the user terminal of the conference member from the presence data storage 313, and transmits the read data to the PoC management server 5 (step S43).

The conference A manager 53a of the PoC management server 5 receives the presence data of each conference member from the SIP/SIMPLE server 3 (step S45), and extracts conference members who can be called from the presence data of each conference member (step S47). That is, the conference members whose presence data indicates a state (e.g. ONLINE) in which the call can be carried out are extracted. When the state is "OFFLINE" or "BUSY", the calling processing described below is not carried out because the calling in the voice conference is impossible. This enables the calling processing to be speedy. However, the processing from the steps S39 to S47 is optional. The processing shifts to a processing of FIG. 17 through terminals G and H. Incidentally, in order to simplify the explanation, it is supposed that the conference member to be called is mere the user B operating the user terminal B.

The processing subsequent to the terminals G and H will be explained by using FIG. 17. The conference A manager 53a of the PoC management server 5 uses the data stored in the user data storage 533a and the MCU information storage 531a to transmit a calling to the conference members who can be called, which includes the conference information (the SIP-URL of the conference A manager 53a, and the IP address and the port number of the PoC-MCU server 7), to the SIP/SIMPLE server 3 (step S49). Incidentally, this calling includes data of the calling request source user. The routing processor 35 of the SIP/SIMPLE server 3 receives the call to the conference members who can be called, which includes the conference information, from the PoC management server 5, and transfers the calling to the user terminal of each conference member (step S51). Here, the voice conference processor 911 of the user terminal B receives the calling including the conference information from the SIP/SIMPLE server 3, and carries out a processing according to the calling (step S53). For example, by ringing the phone at arrival or displaying a predetermined display on the display device, the receipt of the calling is notified to the user B. Incidentally, the received conference information is stored in the storage device and used when transmitting the participation response later.

The voice conference processor 911 of the user terminal B transmits the OK response to the calling to the SIP/SIMPLE server 3 (step S55). The routing processor 35 of the SIP/SIMPLE server 3 receives the OK from the user terminal B, and transfers the response to the PoC management server 5 (step S57). The conference A manager 53a of the PoC management server 5 receives the OK response from the SIP/SIMPLE server 3 (step S59).

In response to the calling at the step S53, the user B judges whether or not he or she participates in the voice conference. When he or she participates in the voice conference, he or she operates the user terminal B to input a conference participation instruction. The voice conference processor 911 of the user terminal B accepts the conference participation instruction by the user B (step S61), and transmits a participation response to the SIP/SIMPLE server 3 (step S63). When receiving the participation response, the routing processor 35 of the SIP/SIMPLE server 3 transfers the participation response to the PoC management server 5 (step S65). The conference A manager 53a of the PoC management server 5 receives the participation response from the user B from the SIP/SIMPLE server 3 (step S67). The conference A manager 53a registers, as the participant, the user ID (i.e. SIP-URL) of the user who carried out the participation response and the IP address of the user terminal into the user data storage 533a. In addition, the conference A manager 53a transmits a participating member addition notice including the user ID (i.e. SIP-URL) of the user who carried out the participation response and the IP address of the user terminal to the PoC-MCU server 7 (step S69). The conference A voice communication manager 71a of the PoC-MCU server 7 receives the participating member addition notice including the user ID and IP address of the participant from the PoC management server 5, and registers the user ID and IP address of the participant into the speaker and participant data storage 711a (step S71).

After the step S69, the conference A manager 53a transmits the OK response to the SIP/SIMPLE server 3 (step S73). The routing processor 35 of the SIP/SIMPLE server 3 receives the OK response from the PoC management server 5, and transfers the OK response to the user terminal B (step S75). The user terminal B receives the OK response from the SIP/SIMPLE server 3 (step S77).

Figure 17:
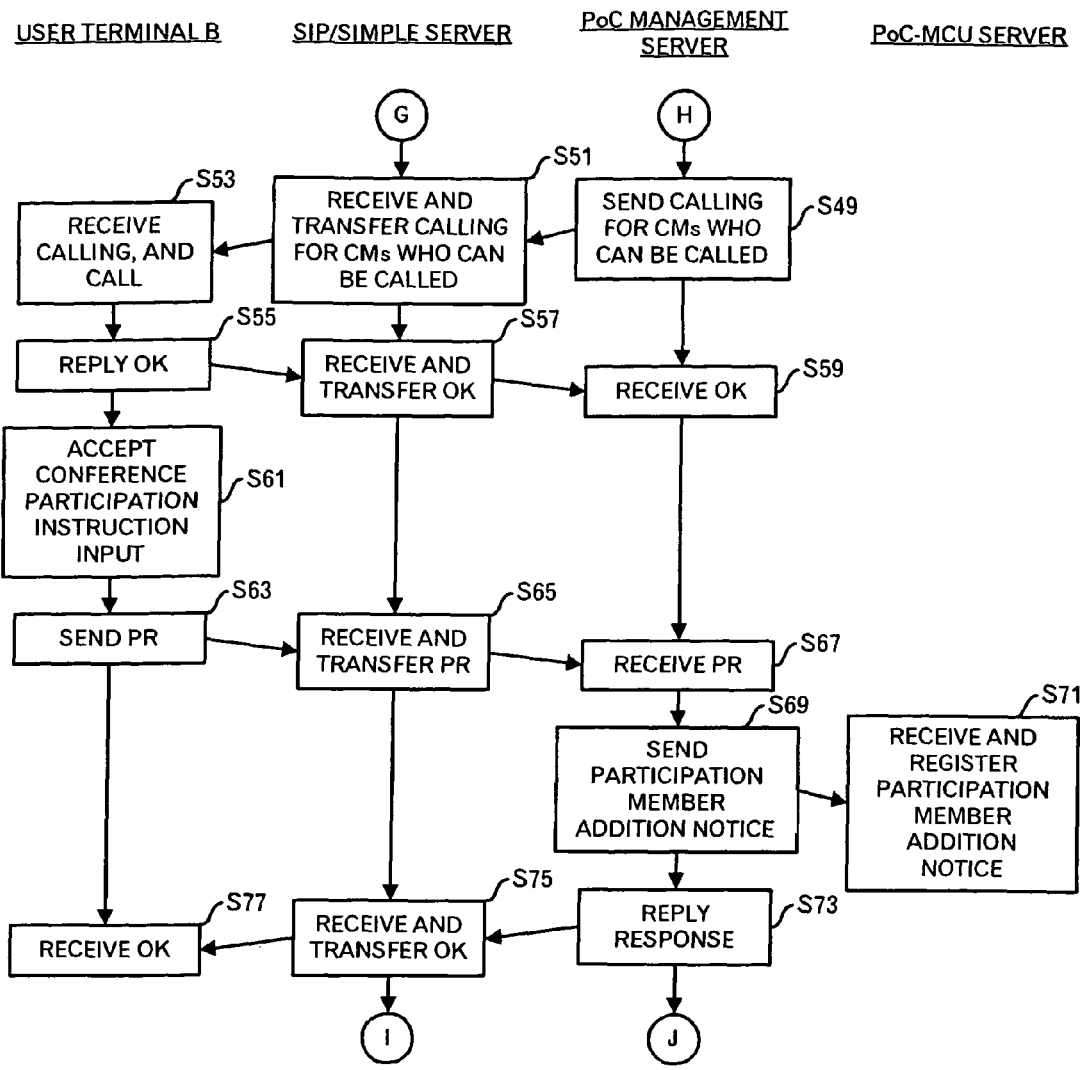
FIG. 17 is a diagram showing a fourth portion of the processing flow according to one embodiment of this invention.

Incidentally, the processing of FIG. 17 is carried out for each conference member who can be called. In addition, the processing shifts to a processing of FIG. 18 through terminals I and J.

Figure 18:
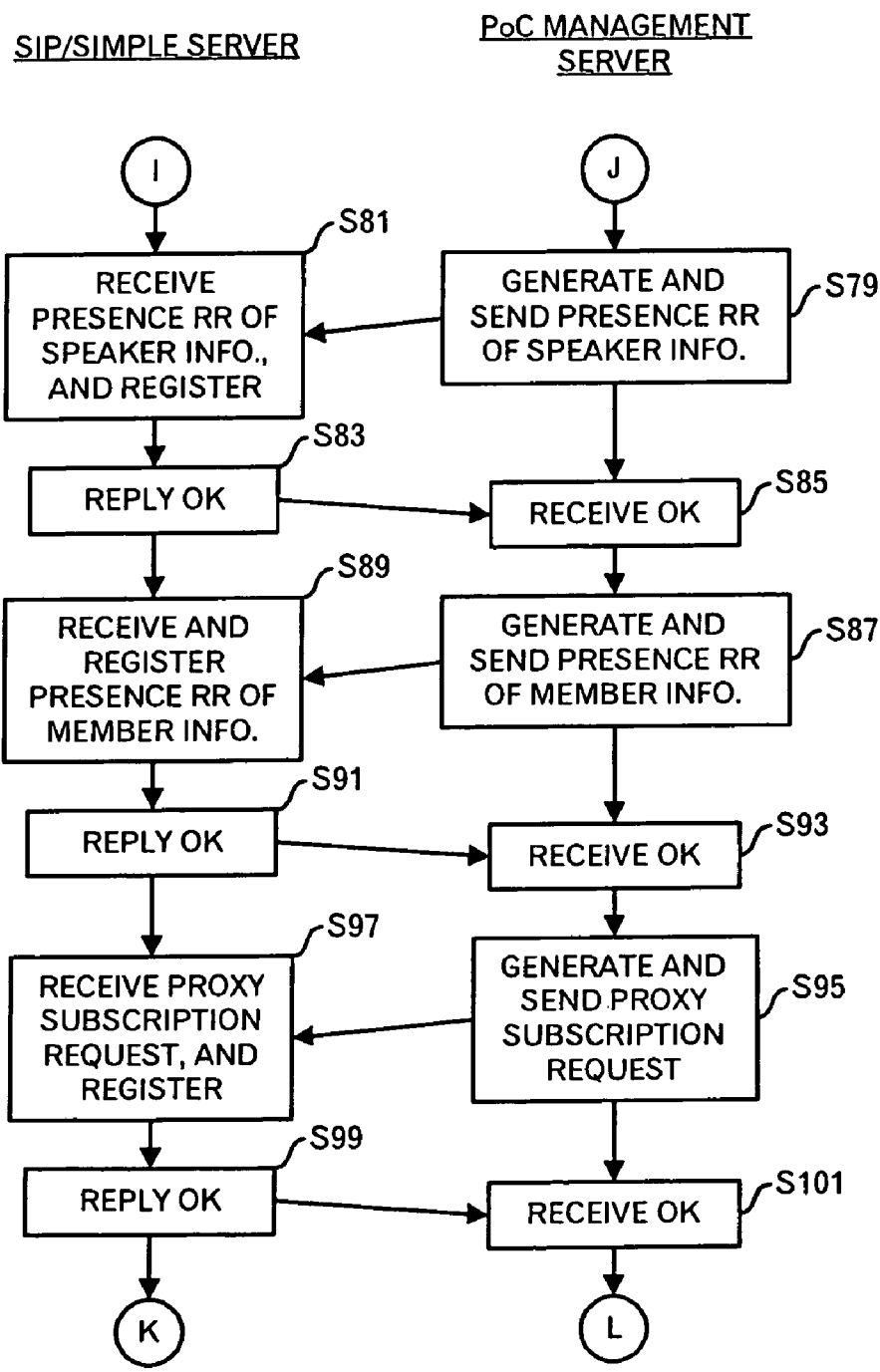
FIG. 18 is a diagram showing a fifth portion of the processing flow according to one embodiment of this invention.

The processing subsequent to the terminals I and J will be explained by using FIG. 18. The conference A manager 53a of the PoC management server 5 uses the data stored in the user data storage 533a to generate a presence registration request of the speaker information including the user ID of the user who has the right to speak, and transmits the request to the SIP/SIMPLE server 3 (step S79). More specifically, it requests to register the user ID of the user having the right to speak as the presence data whose owner is the conference A manager 53a and whose presence ID is "FloorUser". The SIP/SIMPLE server 3 receives the presence registration request of the speaker information from the PoC management server 5. When the conference A presence manager 33a for the conference A manager 53a is not activated, the conference A presence manager 33a is activated at this timing. Then, the presence data manager 331a of the conference A presence manager 33a stores the user ID of the user having the right to speak as the presence data into the presence data storage 333a in association with the presence ID ("FloorUser") relating to the received presence registration request (step S81). As shown in FIG. 6, the user ID "UserA" of the user having the right to speak is registered into the area 3361. In addition, the conference A presence manager 33a transmits the OK response to the PoC management server 5 (step S83). The conference A manager 53a of the PoC management server 5 receives the OK response from the SIP/SIMPLE server 3 (step S85).

Furthermore, the conference A manager 53a of the PoC management server 5 uses the data stored in the user data storage 533a to generate a presence registration request of the member information including the information of the conference members including the user who carried out the calling request, and transmits the request to the SIP/SIMPLE server 3 (step S87). More specifically, it requests to register the user IDs of the conference members including the user who carried out the calling request as the presence data whose presence ID is "Member" and whose owner is the conference A manager 53a. The conference A presence manager 33a of the SIP/SIMPLE server 3 receives the presence registration request of the member information from the PoC management server 5, and the presence data manager 331a of the conference A presence manager 33a stores the presence data (in the example of FIG. 6, "UserA, UserB, UserC") into the presence data storage 333a in association with the presence ID ("Member") relating to the received presence registration request (step S89). In addition, the conference A presence manager 33a transmits the OK response to the PoC management server 5 (step S91). The conference A manager 53a of the PoC management server 5 receives the OK response from the SIP/SIMPLE server 3 (step S93).

In addition, the conference manager 53a of the PoC management server 5 uses the data stored in the user data storage 533a to generate a proxy subscription request for the conference members including the user who carried out the calling request, and transmits the request to the SIP/SIMPLE server 3 (step S95). More specifically, it requests to register the conference members into the subscriber list storage area 3335 in the presence data storage 333a and the area 3382 for the subscriber IDs in the area 338 of the group II "voice conference" in the presence group information storage area 3333. Incidentally, it may request the SIP/SIMPLE server 3 to register the user who carried out the calling request and the users who transmitted the participation response, not the conference members. However, for each participation response, it is necessary to carry out the proxy subscription for the user relating to the participation response. It is also possible to adopt either a method for delivering the presence data such as the participation state, the holder of the right to speak and the like only to the users who transmitted the participation response or a method for delivering the presence data to the called users. This is because it depends on the publication policy of the conference. However, primarily, each user who requires the subscription requests the subscription of the presence data, and after obtaining the permission from the owner of the presence data, each user is registered as the subscriber. Therefore, primarily, each user who participates in the conference or was called must access the SIP/SIMPLE server 3 to request the subscription registration. However, in this embodiment, according to the characteristic of the conference, the PoC management server 5 carries out the proxy subscription registration in a viewpoint in which the subscription of the presence data such as the participation state, the holder of the right to speak and the like is necessary information for the participants (or users who were called) and a viewpoint in which the data communication volume increases in the wireless section when each user is caused to carry out the subscription registration, the communication bandwidth is uselessly wasted, and the progress of the conference becomes slow. Incidentally, the owner of the presence data storage 333a of the conference A presence manager 33a is the conference A manager 53a, and there is no large problem in the proxy subscription registration by the owner.

The conference presence manager 33a of the SIP/SIMPLE server 3 receives the proxy subscription request for the conference members including the user who carried out the calling request from the PoC management server 5, registers the conference members (or participants) into the subscriber list storage area 3335 of the presence data storage 333a, and further registers the conference members (or participants) into the area 3382 for the subscriber IDs in the area 338 of the group II "voice conference" in the presence group information storage area 3333 (step S97). In addition, the conference A presence manager 33a transmits the OK response to the PoC server 5 (step S99). The conference A manager 53a of the PoC management server 5 receives the OK response from the SIP/SIMPLE server 3 (step S101). The processing shifts to a processing of FIGS. 19 and 20 through the terminals K and L.

Thus, when the conference members (or participants) are registered in the subscriber list storage area 3335 and the area 3382 for the subscriber IDs in the area 338 of the group II "voice conference" in the presence group information storage area 3333, the presence data of the presence IDs registered in the area 3381 for the presence IDs in the area 338 of the group II "voice conference" is delivered to the conference members (or participants) by the delivery processor 335a.

Figure 19:
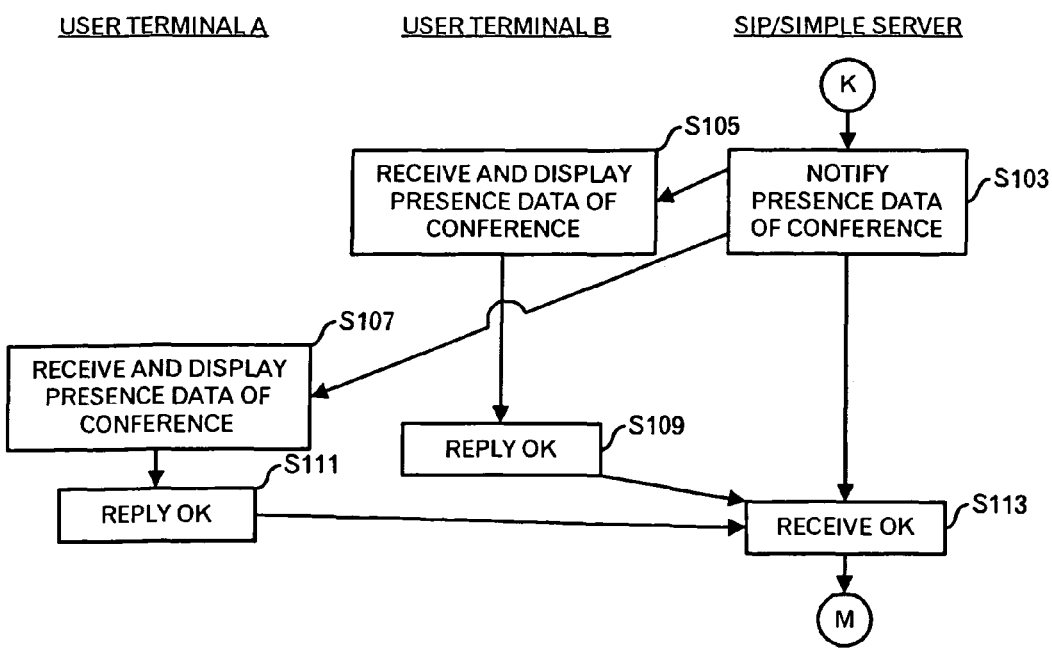
FIG. 19 is a diagram showing a sixth portion of the processing flow according to one embodiment of this invention.

Next, the processing subsequent to the terminal K will be explained by using FIG. 19. The delivery processor 335a of the conference presence manager 33a in the SIP/SIMPLE server 3 carries out a notification processing of the presence data (the user ID of the holder of the right to speak, the user IDs of the conference members, and the user IDs of the participants) of the conference according to the states in the presence data storage 333a (step S103) Here, the presence data of the conference is transmitted to the user terminals A and B. The presence data processor 915 of the user terminal B receives the presence data of the conference from the SIP/SIMPLE server 3, and displays the data on the display device (step S105). Similarly, the presence data processor 915 of the user terminal A receives the presence data of the conference from the SIP/SIMPLE server 3, and displays the data on the display device (step S107).

At this stage, because the participants have not been registered in the presence data storage 333a, the display in which only the conference members and the holder of the right to speak can be grasp is carried out. Then, the presence data processor 915 of the user terminal B replies the OK response to the SIP/SIMPLE server 3 (step S109), and the presence data processor 915 of the user terminal A also replies the OK response to the SIP/SIMPLE server 3 (step S111). The conference A presence manager 33a of the SIP/SIMPLE server 3 receives the OK response from the user terminals A and B (step S113). The processing shifts to a processing of FIG. 20 through a terminal M.

Next, the processing subsequent to the terminal L and M will be explained by using FIG. 20. The conference A manager 53a of the PoC management server 5 uses the data stored in the user data storage 533a to generate a presence registration request of the participants (including not only the users who transmitted the participation response but also the user who carried out the calling request), and transmits the request to the SIP/SIMPLE server 3 (step S115). More specifically, it requests to register the user IDs of the participants as the presence data whose presence ID is "JoinUser" and whose owner is the conference A manager 53a. The conference A presence manager 33a of the SIP/SIMPLE server 3 receives the presence registration request of the participants from the PoC management server 5, and the presence data manager 331a of the conference A presence manager 33a stores the presence ID ("JoinUser") and the presence data (in the example of FIG. 6, "UserA, UserB"), which relate to the received presence registration request, into the presence data storage 333a (step S117). In addition, the conference A presence manager 33a transmits the OK response to the PoC management server 5 (step S119). The conference A manager 53a of the PoC management server 5 receives the OK response from the SIP/SIMPLE server 3 (step S121).

Then, the delivery processor 335a of the conference A presence manager 33a in the SIP/SIMPLE server 3 carries out a notification processing of the presence data (user ID of the holder of the right to speak, user IDs of the conference members, and the user IDs of the participants) of the conference according to the state of the presence data storage 333a (step S123). Here, the presence data of the conference is transmitted to the user terminals A and B. The presence data processor 915 of the user terminal B receives the presence data of the conference from the SIP/SIMPLE server 3, and displays the data on the display device (step S125). Similarly, the presence data processor 915 of the user terminal A receives the presence data of the conference from the SIP/SIMPLE server 3, and displays the data on the display device (step S127).

At this stage, because the participants have been registered into the presence data storage 333a at the step S117, a display in which the conference members, the participants, the holder of the right to speak and users who was called but does not participate can be grasp is carried out. Then, the presence data processor 915 of the user terminal B replies the OK response to the SIP/SIMPLE server 3 (step S129), and the presence processor 915 of the user terminal A also replies the OK response to the SIP/SIMPLE server 3 (step S131). The conference presence manager 33a of the SIP/SIMPLE server 3 receives the OK responses from the user terminals A and B (step S133). The processing shifts to a processing of FIG. 21 through a terminal N. The processing also shifts to a processing of FIG. 22 through a terminal P.

When the conference members were registered for the subscription at the step S97, the steps S115 to S133 are executed for each appearance of the new participant. When the participants were registered for the subscription at the step S97, the steps S115 to S133 are executed for each appearance of the new participant, the presence data is delivered to the users who have been registered for the subscription as the participants, and, furthermore, the steps S95 to S113 are executed and the presence data is delivered to the new participant.

Figure 20:
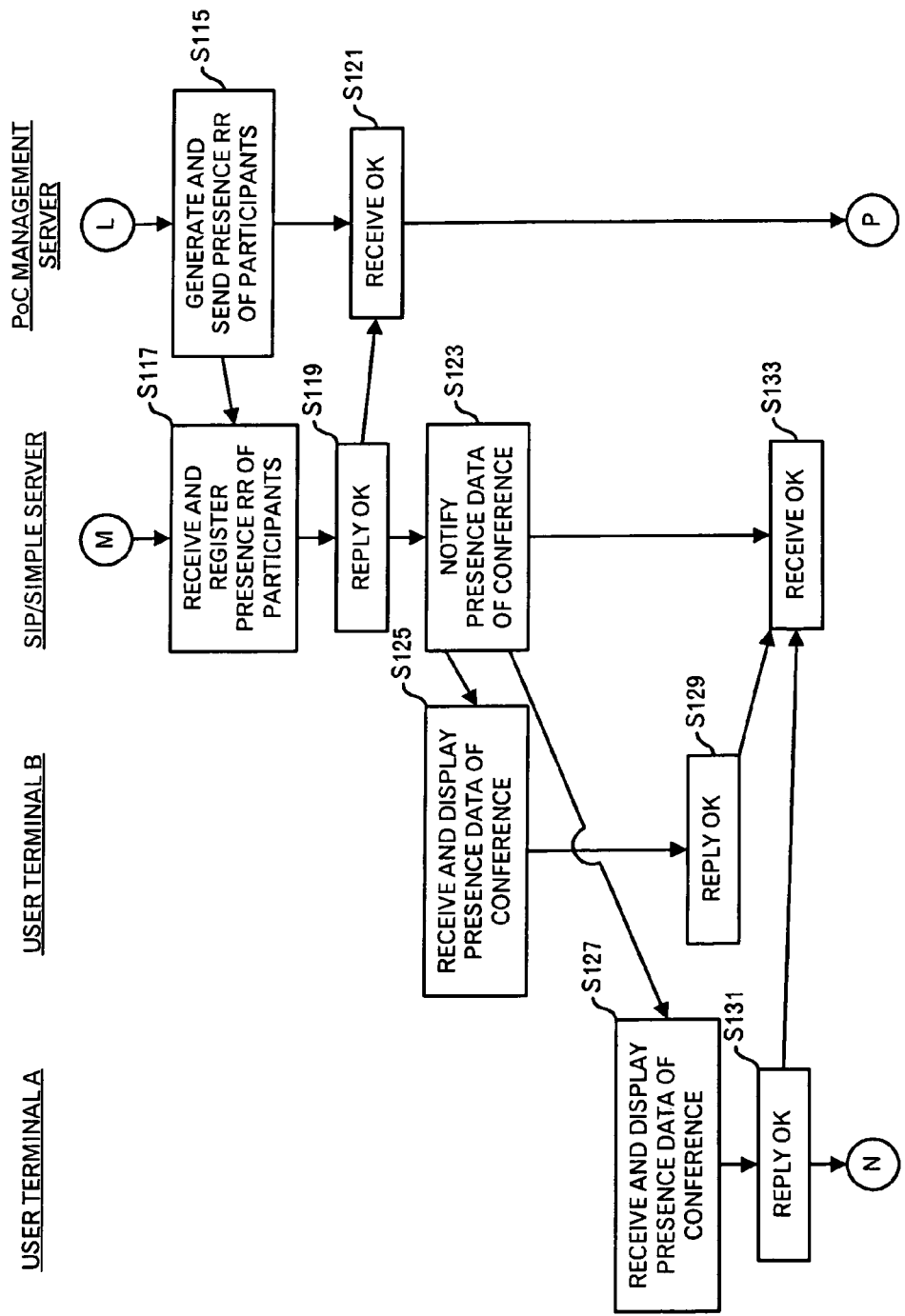
FIG. 20 is a diagram showing a seventh portion of the processing flow according to one embodiment of this invention.

When the processing shown in FIG. 20 has been completed, each participant of the teleconference can recognize other participants, and can start the conference. Incidentally, because the user who carried out the calling request holds the right to speak, only this user can speak.

Figure 21:
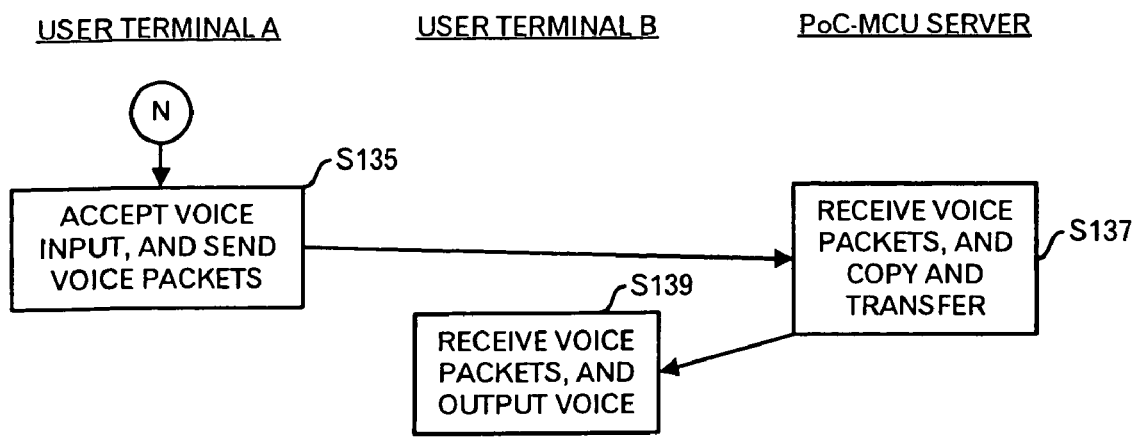
FIG. 21 is a diagram showing an eighth portion of the processing flow according to one embodiment of this invention.

That is, the processing shown in FIG. 21 is carried out. Because the user A has the right to speak, the user A speaks to the user terminal A. The user terminal A accepts the voice input from the user A by the microphone, and the voice conference processor 911 generates the voice packets from the voice data generated by the microphone driver 93, and transmits the packets to the PoC-MCU server 7 (step S135). At this time, the IP address and the port number of the PoC-MCU server 7, which were received as the conference information, is used. That is, the voice packets are directly transmitted to the PoC-MCU server 7.

The conference A voice communication manager 71a of the PoC-MCU server 7 receives the voice packets from the user terminal A, and transfers the copy of the voice packets to the IP addresses of the participants, which are stored in the speaker and participant data storage 711a (step S137). The voice conference processor 911 of the client application 91 in the user terminal B receives the voice packets from the PoC-MCU server 7, and outputs the voice relating to the voice packets through a speaker driver and a speaker not shown. Thus, the voice-based teleconference is carried out. Incidentally, the movement of the right to speak is not the main portion of this embodiment. Therefore, the explanation is omitted, here.

Next, the processing subsequent to the terminal P will be explained by using FIG. 22. The conference A manager 53a of the PoC management server 5 uses the data stored in the user data storage 533a to generate an update registration request of the presence data so as to change, for each participant (including the user who carried out the calling request), the presence data of the participants to "BUSY" (or in the voice conference or the like), and transmits the request to the SIP/SIMPLE server 3 (step S141). More specifically, when assuming that the participants are the users A and B, it generates the presence data update registration request to change the data stored in the area 316 (whose presence ID is "State") of the presence information storage area 3131 in the presence data storage 313a of the user A presence manager 31a to "BUSY" or the like, and the presence data update registration request to change the data stored in the area 316 of the presence information storage area 3131 in the presence data storage 313b of the user B presence manager 31b to "BUSY" or the like, and transmits the requests to the SIP/SIMPLE server 3.

Primarily, the data of the presence data storage 313a in the user A presence manager 31a can be changed only by the user A. Similarly, the data of the presence data storage 313b in the user B presence manager 31b can be changed only by the user B. However, in this embodiment, in order to smoothly progress the voice conference and reduce the communication volume in the wireless section, the change is permitted to the PoC management server 5, specially. As described above, it is effective that the supervisor authority for the presence data in the SIP/SIMPLE server 3 is granted to the PoC management server 5.

The user A presence manager 31a (and the user B presence manager 31b. However, in the following, because of the duplication, the explanation is omitted.) of the SIP/SIMPLE server 3 receives the update registration request of the presence data of the participant from the PoC management server 5, and the presence data manager 311 of the user A presence manager 31a stores the presence data such as "BUSY" or the like in association with the presence ID "State" (step S143). The user A presence manager 31a of the SIP/SIMPLE server 3 transmits the OK response to the PoC management server 5 (step S145). The conference A manager 53a of the PoC management server 5 receives the OK response from the SIP/SIMPLE server 3 (step S147).

Thus, when the update of the presence data of the users A and B is carried out, the presence data of the user A or B is notified to the users who are registered as the subscribers of the presence ID "State". That is, the delivery processor 315 of the user A presence manager 31a in the SIP/SIMPLE server 3 carries out a notification processing of the presence data of the user A according to the state of the presence data storage 313a (step S149). In the example of FIG. 5, the presence data is transmitted to the users B and C. Incidentally, the similar processing for the user B presence manager 31b is carried out. However, the presence data of the user B is transmitted to the users A and C.

Then, the presence processor 915 of the terminal B receives the presence data of the user A from the SIP/SIMPLE server 3, and displays the data on the display device (step S151). Similarly, the presence data processor 915 of the user terminal A receives the presence data of the user B from the SIP/SIMPLE server 3, and displays the data on the display device (step S153). In the other user terminals, the display is changed, similarly. This enables other users who subscribe the state of the participants of the voice-based teleconference to recognize the participants cannot be reached because of BUSY.

Then, the presence data processor 915 of the user terminal B replies the OK response to the SIP/SIMPLE server 3 (step S155), and the presence data processor 915 of the user terminal A also replies the OK response to the SIP/SIMPLE server 3 (step S157). The user A presence manager 31a and the user B presence manager 31b of the SIP/SIMPLE server 3 receives the OK response to the user terminals A and B (step S159).

By carrying out such a processing, it becomes possible for the users to smoothly progress the voice-based teleconference, and the wireless communication bandwidth is not wasted.

Figure 23:
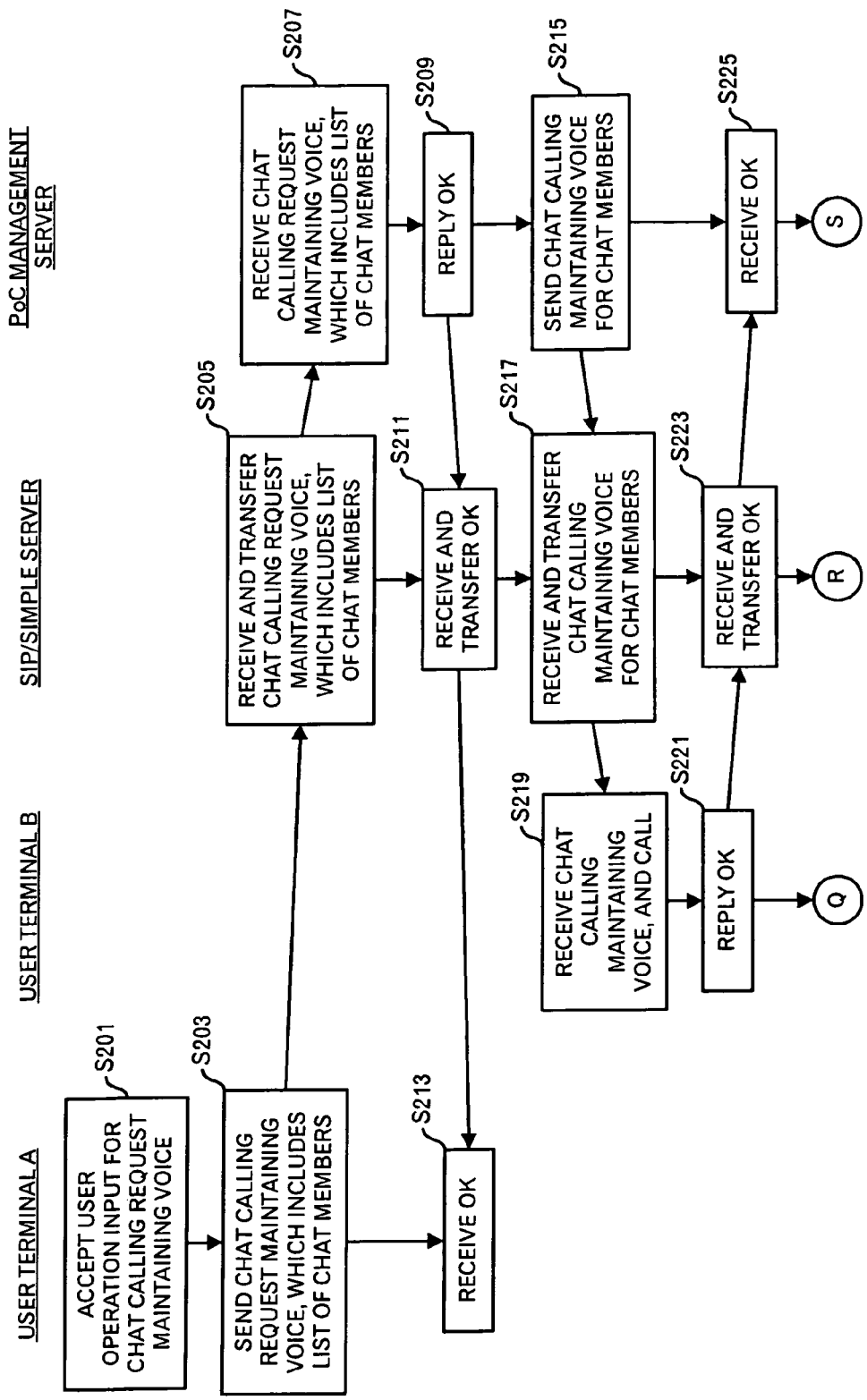
FIG. 23 is a diagram showing a first portion of the processing flow of a chat start processing according to one embodiment of this invention.
Figure 24:
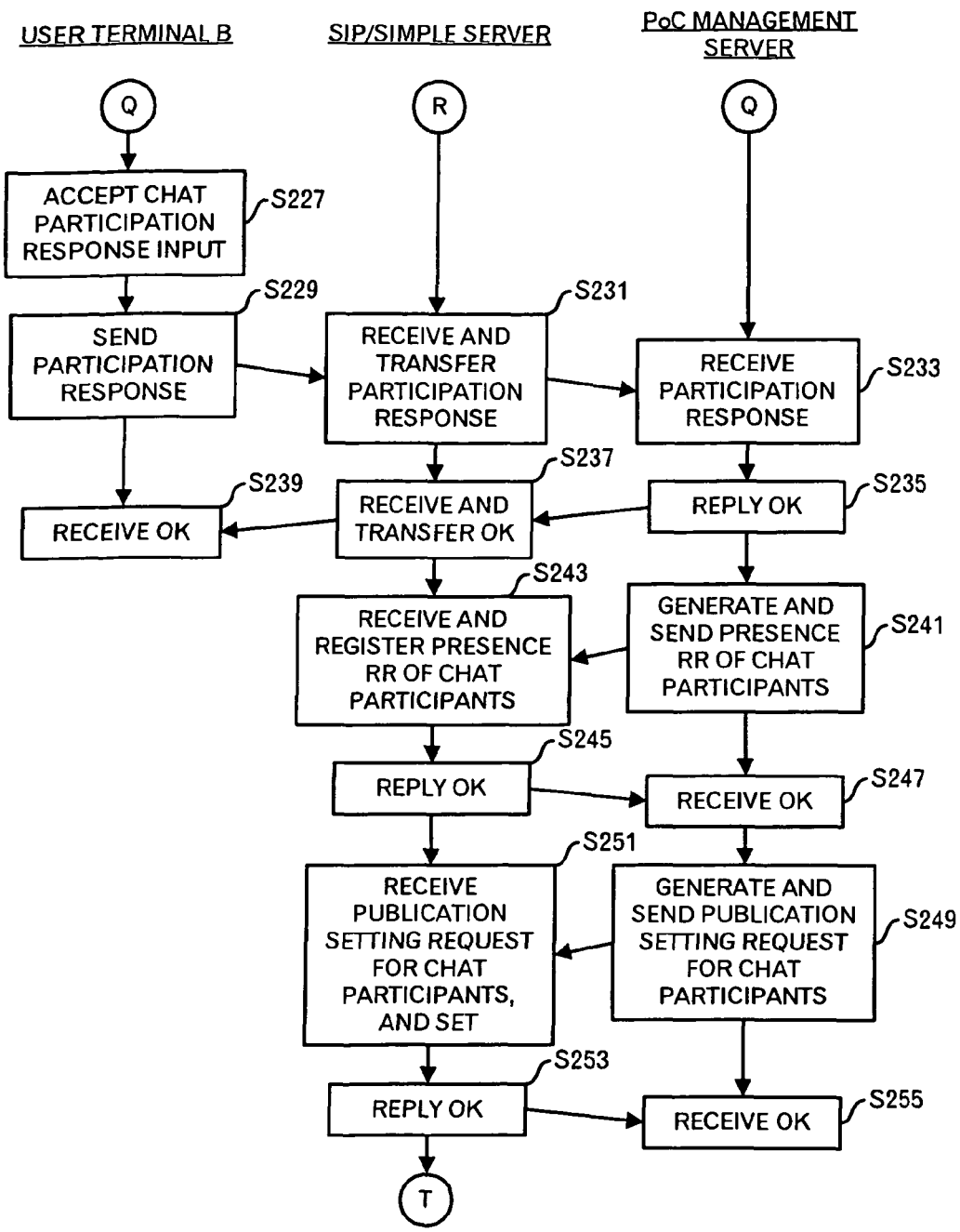
FIG. 24 is a diagram showing a second portion of the processing flow of the chat start processing according to one embodiment of this invention.

Next, a processing when starting the character-based teleconference (chat) on the way of the voice-based teleconference will be explained by using FIGS. 23 to 25. First, in the voice-based teleconference in which the users A, B, C and the like participate, for example, a case where the user A unofficially carries out a meeting with the user B by the character-based chat not the voice will be explained. In this case, the voice-based teleconference is maintained.

First, the user A operates the user terminal A to designate the maintenance of the voice-based teleconference and the user B of the participant who is called into the chat. The chat processor 913 of the user terminal A accepts such a user operation input for a chat calling request maintaining the voice (step S201), and transmits the chat calling request maintaining the voice, which includes a list of the chat members (here, user B) to the SIP/SIMPLE server 3 (step S203). Incidentally, when there is no designation input for the calling destination from the user A, for example, all of the participants of the voice-based teleconference may be set as the calling destination. The routing processor 35 of the SIP/SIMPLE server 3 receives the chat calling request maintaining the voice, which includes the list of the chat members, from the user terminal A, and transfers the request to the PoC management server 5 (step S205).

The conference A manager 53a of the PoC management server 5 receives the calling request maintaining the voice, which includes the list of the chat members, from the SIP/SIMPLE server 3, and stores the list of the chat members into the user data storage 533a (step S207). Then, the conference A manager 53a of the PoC management server 5 replies the OK response to the SIP/SIMPLE server 3 (step S209). The routing processor 35 of the SIP/SIMPLE server 3 receives the OK response from the PoC management server 5, and transfer the response to the SIP/SIMPLE server 3 (step S213). The chat processor 913 of the user terminal A receives the OK response from the SIP/SIMPLE server 3 (step S213).

In addition, the conference A manager 53a of the PoC management server 5 transmits a chat calling maintaining the voice to the chat members (here, the user B) for each chat member according to the received list of the chat members to the SIP/SIMPLE server 3 (step S215). Incidentally, data about the calling source user is included in the chat calling.

The routing processor 35 of the SIP/SIMPLE server 3 receives the chat calling maintaining the voice for the chat members from the PoC management server 5, and transfers the chat calling to the user B (step S217). The chat processor 913 of the user terminal B receives the chat calling maintaining the voice from the SIP/SIMPLE server 3, and carries out a chat calling processing such as a display for the chat calling, output of a predetermined voice or the like (step S219). Incidentally, the chat processor 913 of the user terminal B transmits the OK response to the SIP/SIMPLE server 3 (step S221). The routing processor 35 of the SIP/SIMPLE server 3 receives the OK response from the user terminal B, and transfers the response to the PoC management server 5 (step S223). The conference A manager 53*a* of the PoC management server 5 receives the OK response from the SIP/SIMPLE server (step S225). The processing shifts to a processing of FIG. 24 through terminals Q, R and S.

The processing subsequent to the terminals Q, R and S will be explained by using FIG. 24. The user B recognizes the chat calling, and judges whether or not he or she participates in the chat. When he or she decides to participate in the chat, he or she inputs a chat participation response into the user terminal B. The user terminal B accepts the input of the chat participation response by the user B (step S227), and transmits the participation response by the user B to the SIP/SIMPLE server 3 (step S229). The routing processor 35 of the SIP/SIMPLE server 3 receives the participation response by the user B from the user terminal B, and transfers the response to the PoC management server 5 (step S231). The conference A manager 53*a* of the PoC management server 5 receives the participation response by the user B from the SIP/SIMPLE server 3, and stores the data representing the chat participation in association with the user B in the user data storage 533*a* (step S233).

In response to this, the conference A manager 53*a* of the PoC management server 5 transmits the OK response to the SIP/SIMPLE server 3 (step S235). The routing processor 35 of the SIP/SIMPLE server 3 receives the OK response from the PoC management server 5, and transfers the response to the user terminal B (step S237). The chat processor 913 of the user terminal B receives the OK response from the SIP/SIMPLE server 3 (step S239).

Then, the conference A manager 53*a* of the PoC management server 5 uses the data stored in the user data storage 533*a* to generate a presence registration request of the chat participants (including the user of the chat calling request source, and here the users A and B), and transmits the request to the SIP/SIMPLE server 3 (step S241). More specifically, it requests to register the user IDs (in the example of FIG. 6, "UserA, UserB") of the participants as the presence data whose presence ID is "ChatUser", and whose owner is the conference A manager 53*a*. The presence data manager 331*a* of the conference A presence manager 33*a* in the SIP/SIMPLE server 3 receives the presence registration request of the chat participants from the PoC management server 5, and stores the user IDs (in the example of FIG. 6, "UserA, UserB") of the chat participants into the presence data storage 333*a* in association with the presence ID ("ChatUser") relating to the received presence registration request (step S243). As shown in FIG. 6, the user IDs (in the example of FIG. 6, "UserA, UserB") of the participants are registered into the area 3365 of the presence information storage area 3331. In addition, the conference A presence manager 33*a* transmits the OK response to the PoC management server 5 (step S245). The conference A manager 53*a* of the PoC management server 5 receives the OK response from the SIP/SIMPLE server 3 (step S247).

Furthermore, the conference A manager 53*a* of the PoC management server 5 uses the data stored in the user data storage 533*a* to generate a publication-setting request for the chat participants, and transfers the request to the SIP/SIMPLE server 3 (step S249). More specifically, it requests to register the user IDs (in the example of FIG. 6, "UserA, UserB") of the chat participants into the area 3392 for the subscriber ID in the area 339 for the group III "chat" of the presence group information storage area 3333. The presence data manager 331*a* of the conference A presence manager 33*a* in the SIP/SIMPLE server 3 receives the publication setting request (proxy subscription request) for the chat participants from the PoC management server 5, and stores the user IDs of the chat participants relating to the received publication setting request into the area 3392 for the subscriber ID in the area 339 for the group III "chat" of the presence group information storage area 3333 (step S251). In addition, the conference A presence manager 33*a* transmits the OK response to the PoC management server 5 (step S253). The conference A manager 53*a* of the PoC management server 5 receives the OK response from the SIP/SIMPLE server 3 (step S255). The processing shifts to a processing of FIG. 25 through a terminal T.

Figure 25:
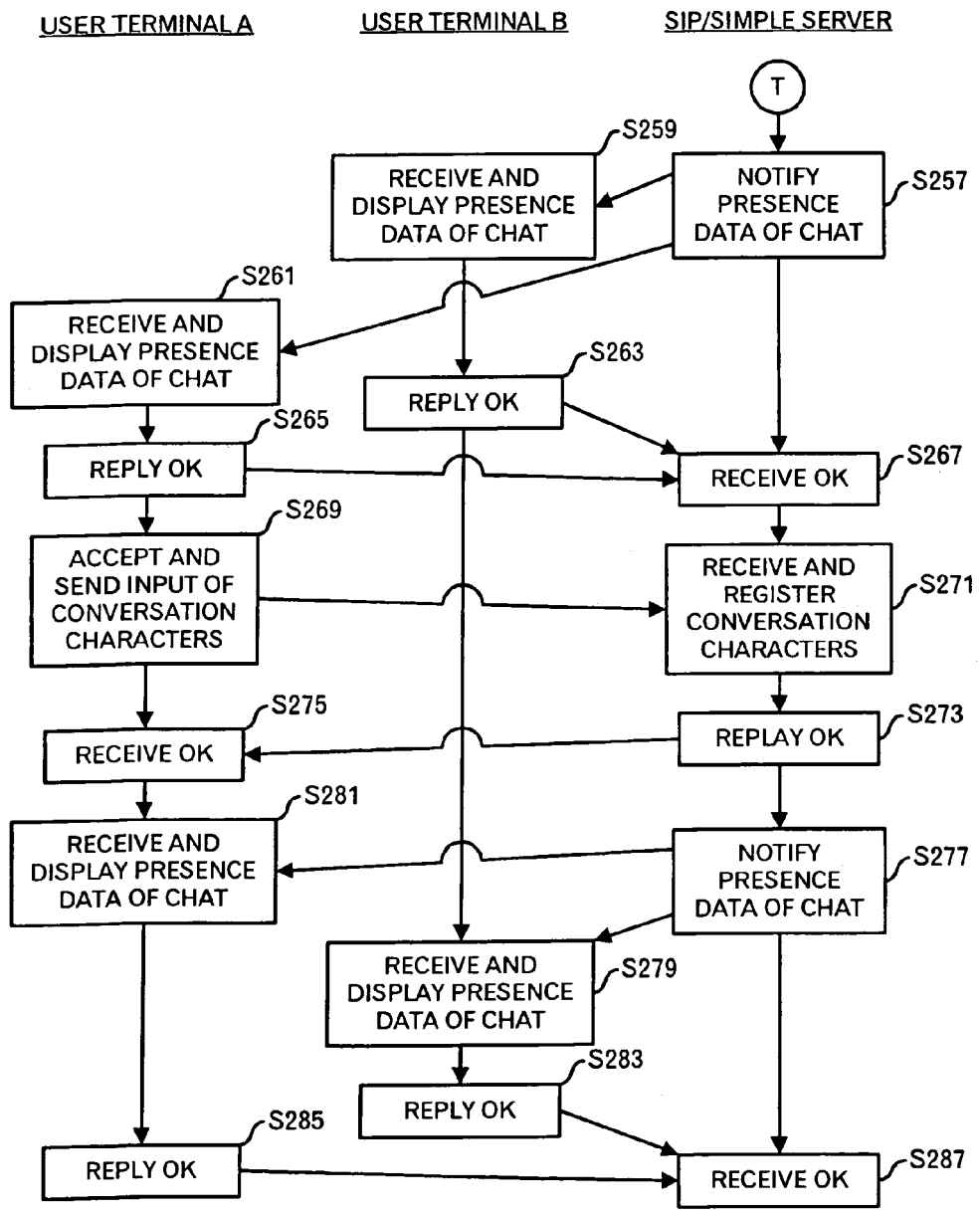
FIG. 25 is a diagram showing a third portion of the processing flow of the chat start processing according to one embodiment of this invention.

Incidentally, when the processing of the conference A presence manager 33*a* of the SIP/SIMPLE server in FIG. 25 is completed, the presence data identified in the area 3391 of the presence ID included in the area 339 for the group III "chat" in the presence group information storage area 3333 is notified to the chat participants. That is, the presence data "Chat contents" (in the example of FIG. 6, "Hello . . . ") whose presence ID is "Chat" and the presence data "Chat participants" (in the example of FIG. 6, "UserA, UserB") whose presence ID is "ChatUser" are automatically notified when updated. However, because the owner of the presence data is the conference A manager 53*a*, normally, the chat participants cannot update the presence data. When the chat participants cannot change the chat contents, the chat cannot be progressed. On the other hand, when the chat is started during the voice-based teleconference, if a processing such as activating the presence managers owned by the chat participants in addition to the conference A presence manager 33*a* is carried out, there is a problem that the resources of the SIP/SIMPLE server 3 and the PoC management server 5 is redundantly wasted. Therefore, in this embodiment, the chat participants registered as the presence data whose presence ID is "ChatUser" can update the presence data whose presence ID is "Chat" regardless of the owner. That is, in response to the presence registration request of the chat participants at the step S241 or the publication-setting request (proxy subscription request) for the chat participants at the step S249, the authority to update the chat contents is granted to the chat participants. Thus, without wasting the resources, it becomes possible to smoothly start the chat.

Next, the processing subsequent to the terminal T will be explained by using FIG. 25. Here, the delivery processor 335*a* of the conference presence manager 33*a* in the SIP/SIMPLE server 3 notifies the user terminals A and B of the presence data of the chat (the presence data of the chat contents and presence data of the chat participants) according to the setting of the presence data storage 333*a* (step S257). Initially, because no chat contents are registered, none is notified. The presence data processor 915 of the client application 91 in the user terminal B receives the presence data of the chat from the SIP/SIMPLE server 3, and displays the data on the display device (step S259). In addition, the presence data processor 915 of the client application 91 in the user terminal A receives the presence data of the chat from the SIP/SIMPLE server 3, and displays the data on the display device (step S261). The presence data processor 915 of the user terminal B replies the OK response to the SIP/SIMPLE server 3 (step S263). Similarly, the presence data processor 915 of the user terminal A replies the OK response to the SIP/SIMPLE server 3 (step S265). The conference A presence manager 33a of the SIP/SIMPLE server 3 receives the OK response from the user terminals A and B (step S267).

Furthermore, for example, the user A operates the user terminal A to input the chat contents (dialogue characters), and the presence data processor 915 of the user terminal A accepts the input of the dialogue characters by the user A, and transmits them as the presence data of the presence ID "Chat" to the SIP/SIMPLE server 3 (step S269). The presence data manager 331a in the conference. A presence manager 33a of the SIP/SIMPLE server 3 receives the dialogue characters data as the presence data of the presence ID "Chat" from the user terminal A, and stores the data into the presence data storage 333a (step S271). The conference A presence manager 33a transmits the OK response to the user terminal A (step S273). The user terminal A receives the OK response from the SIP/SIMPLE server 3 (step S275).

Thus, because the presence data is updated, the delivery processor 335a of the conference A presence manager 33a in the SIP/SIMPLE server 3 notifies the user terminals A and B of the presence data (the presence data of the chat contents and the presence data of the chat participants when updated) of the chat according to the setting of the presence data storage 333a (step S277). Only the difference may be notified. The presence data processor 915 of the client application 91 in the user terminal B receives the presence data of the chat from the SIP/SIMPLE server 3, and displays the data on the display device (step S279). In addition, the presence data processor 915 of the client application 91 in the user terminal A receives the presence data of the chat from the SIP/SIMPLE server 3, and displays the data on the display device (step S281). The presence data processor 915 of the user terminal B replies the OK response to the SIP/SIMPLE server 3 (step S283). Similarly, the presence data processor 915 of the user terminal A replies the OK response to the SIP/SIMPLE server 3 (step S285). The conference A presence manager 33a of the SIP/SIMPLE server 3 receives the OK response from the user terminals A and B (step S287).

In the following, by repeating the processing of the steps S269 to S287, the dialogue can be progressed in the chat. Incidentally, the dialogue characters can be transmitted from the user terminal B. The processing content is similar. Therefore, further explanation is omitted.

By carrying out such a processing, while maintaining the voice-based teleconference, it becomes possible to separately carry out the character-based chat in the subset of the participants of the voice-based teleconference. Incidentally, because the chat is realized by using the presence technique, the resources prepared for the voice-based teleconference can be efficiently used.

In addition, because plural chat groups can be managed by preparing plural sets of the presence group information and the presence data corresponding to it for one voice conference, for example, as the subset of the voice conference in which four persons A, B, C and D participate, the chats of plural subsets can be carried out such as the users A and B and users C and D respectively carry out the chat, or the users A and B and users A and C respectively carry out the chat.

In addition, the presence data of a specific user is managed in the presence information storage area 3131 in FIG. 5. However, here, for instance, when the presence ID "position" is provided, and the presence data of either "teacher" or "student" is stored, it becomes possible to control so that the user whose presence data is "student" is permitted to call only the user whose presence data is "teacher" as the calling destination of the chat, and the user whose presence data is "teacher" is permitted to call any users. That is, it becomes possible to control the transmission of the presence data by using the presence data managed for each user.

On the other hand, the presence data of the voice-based teleconference is managed in the presence information storage area 3331 of FIG. 6. However, for example, when the subscriber ID of the participant having a position of the teacher is registered for the presence ID "teacher", and further the subscriber IDs of the participants having a position of the student are registered for the presence ID "student", the similar processing can be carried out. That is, it becomes possible to control such as the user registered as the presence data whose presence ID is "teacher" can call all of the conference participants into the chat, and the user registered as the presence data whose presence ID is "student" can call only the user registered as the presence data whose presence ID is "teacher" into the chat. Therefore, it becomes possible to control the transmission of the presence data by using the presence data managed for each conference.

Next, by using FIGS. 26 to 29, a processing when the delivery of the image data necessary, for example, in the teleconference is started on the way of the voice-based teleconference will be explained. First, three kinds of processing when, for example, the user A delivers an image to the user B in the voice-based teleconference in which the user A, the user B, the user C and the like participate will be explained. Incidentally, in the following explanation, in order to simplify the explanation, the explanation of the transmission and receipt of the OK response will be omitted.

Figure 26:
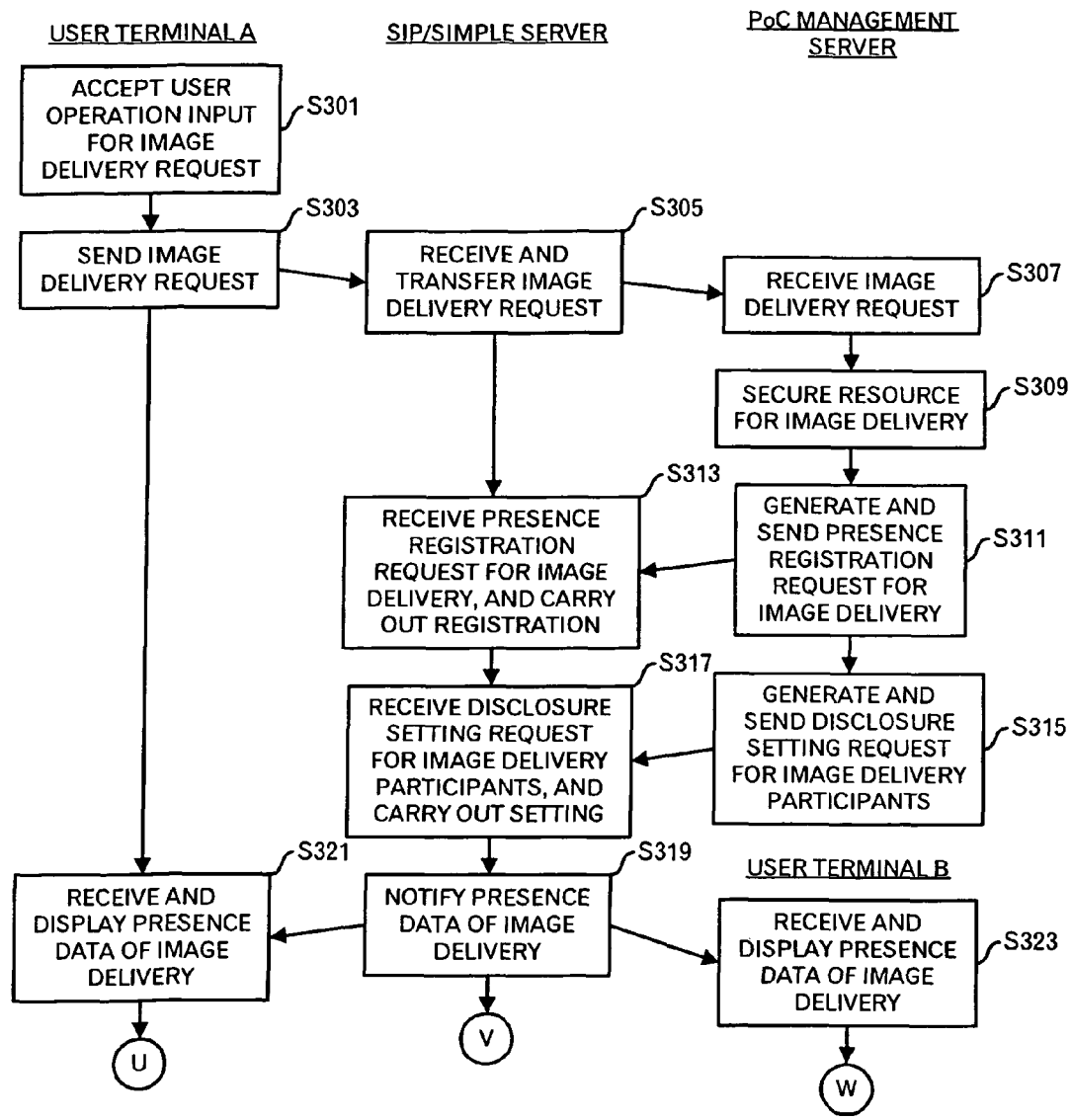
FIG. 26 is a diagram showing a first portion of the first to third processing flows of an image delivery processing in an embodiment of this invention.
Figure 27:
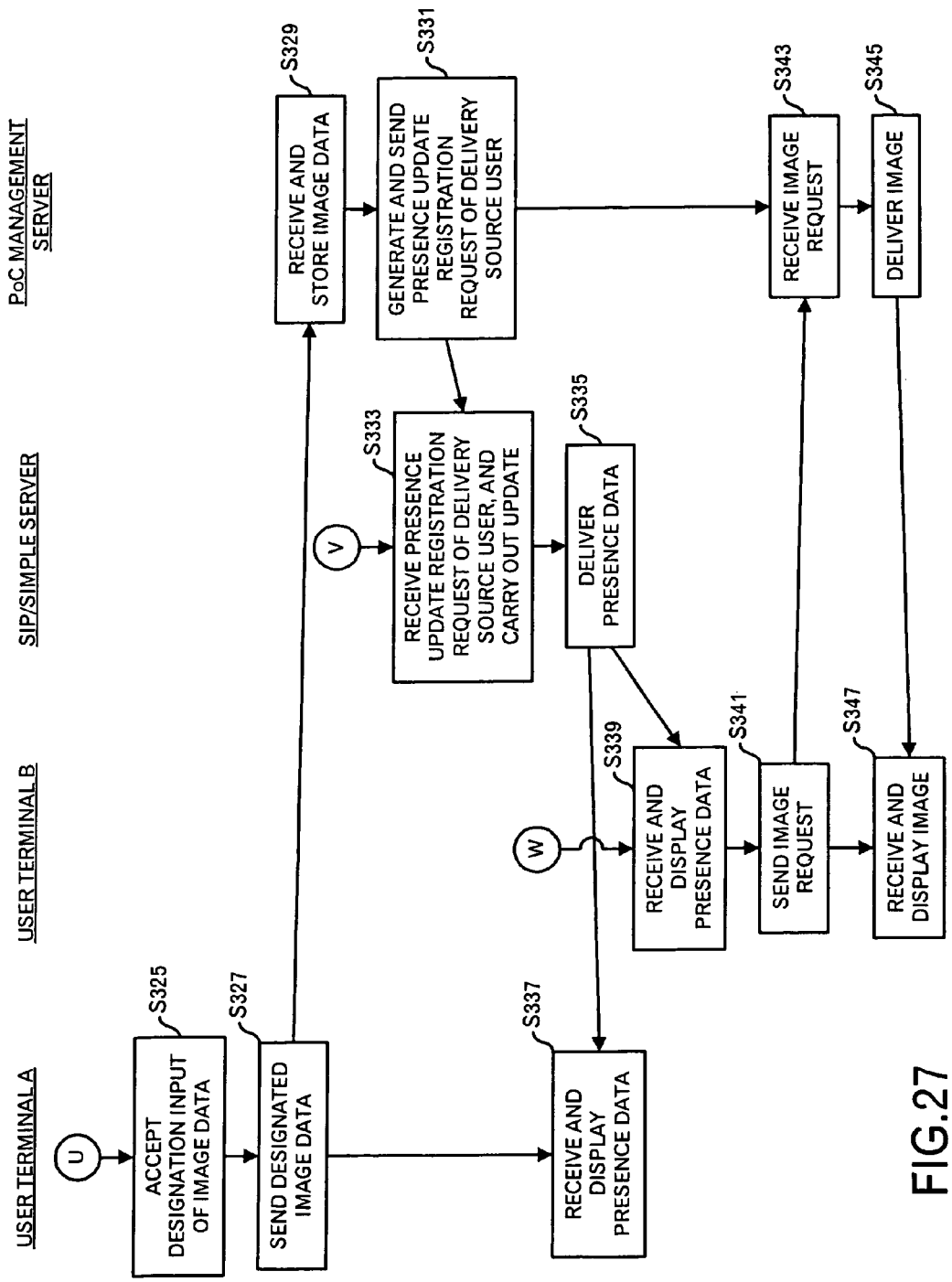
FIG. 27 is a diagram showing a second portion of the first processing flow of the image delivery processing in the embodiment of this invention.

A processing flow according to a first example will be shown in FIGS. 26 and 27. First, during the voice-based teleconference, the user A who is a participant of the teleconference carries out an operation for an image delivery request by selecting the user B and the like in order to deliver image data necessary in the teleconference to the user B and the like. The image processor 916 in the client application 91 of the user terminal A accepts a user operation input for the image delivery request, including the selection of the delivery destination users such as the user B, from the user A, and transmits the image delivery request including the user IDs of the delivery destination users to the SIP/SIMPLE server 3 (step S303). The routing processor 35 of the SIP/SIMPLE server 3 receives the image delivery request from the user terminal A, and transfers the request to the PoC management server 5 (step S305).

The conference A manager 53a of the PoC management server 5 receives the image delivery request from the user terminal A, and stores the user ID of the image delivery request source user and the user IDs of the delivery destination users into, for example, the user data storage 533a (step S307). Then, the conference A manager 53a secures the resource for the image delivery (image storage area in the image data storage 535a and IP address and port number of the upload destination resource) (step S309). Then, the conference A manager 53a generates a presence registration request for the image delivery, and transmits the request to the PoC management server 5 (step S311). More specifically, the conference A manager 53a requests to register the user IDs of the image delivery participants as the presence data whose owner is the conference A manager 53a and whose presence ID is "PhotoUser", and register the resource data for the image delivery as the presence data whose owner is the conference A manager 53a and whose presence ID is "Photo".

The presence data manager 331a of the conference A presence manager 33a in the SIP/SIMPLE server 3 receives the presence registration request for the image delivery from the PoC management server 5, stores, as the presence data, the user IDs of the image delivery participants into the presence data storage 333a in association with the presence ID ("PhotoUser") relating to the received presence registration request, and stores, as the presence data, the resource data for the image delivery into the presence data storage 333a in association with the presence ID ("Photo") relating to the received presence registration request (step S313). As shown in FIG. 6, the user IDs (in the example of FIG. 6, "UserA, UserB") of the image delivery participants are registered into the area 3367 of the presence information storage area 3331. Furthermore, the resource data (in the example of FIG. 6, "xxx.xxx.xxx.xxx:xxxx") for the image delivery is registered into the area 3366 of the presence information storage area 3331.

Moreover, the conference A manager 53a of the PoC management server 5 generates a disclosure-setting request (proxy subscription request) for the image delivery participants by using data stored in the user data storage 533a, and transmits the disclosure-setting request to the SIP/SIMPLE server 3 (step 315). More specifically, the conference A manager 53a requests to register the user IDs of the image delivery participants into the area 3402 of the subscriber ID in the area 340 for the group IV "Image" of the presence group information storage area 3333. The presence data manager 331a of the conference A presence manager 33a in the SIP/SIMPLE server 3 receives the disclosure setting request (proxy subscription request) for the image delivery request from the PoC management server 9, and stores the user IDs (in the example of FIG. 6, "UserA, UserB") of the image delivery participants relating to the received disclosure setting request into the area 3402 of the subscriber IDs in the area 340 for the group IV "Image" of the presence group information storage area 3333 (step S317).

After that, the delivery processor 335a of the conference A presence manager 33a in the SIP/SIMPLE server 3 notifies the user terminals A and B of the presence data for the image delivery (the resource data for the image delivery (especially, the upload destination resource (IP address and port number) and the presence data of the image delivery participants)) according to the setting of the presence data storage 333a (step S319). The presence data processor 915 of the client application 91 in the user terminal B receives the presence data for the image delivery from the SIP/SIMPLE server 3, and displays the received presence data on the display device (step S323). In addition, the presence data processor 915 of the client application 91 in the user terminal A receives the presence data for the image delivery from the SIP/SIMPLE 3, and displays the received presence data on the display device (step S321). By this processing, each user terminal can obtain the transmission destination data (the upload destination resource) of the image data to be delivered. The processing shifts to a processing of FIG. 27 through the terminals U, V and W.

Next, the processing subsequent to the terminals U, V and W will be explained by using FIG. 27. The user A of the user terminal A, which transmitted the image delivery request, operates the user terminal A to designate the image data (image file) to be delivered. The image processor 916 in the client application 91 of the user terminal A accepts the designation input of the image data from the user A (step S325), reads out the image data from the storage device of the user terminal A, and transmits the designated image data to the upload destination resource (IP address and port number) (step S327). The conference A manager 53a of the PoC management server 5 receives the image data from the user terminal A, and stores the image data into the image data storage 535a (step S329).

Then, the conference A manager 53a of the PoC management server 5 generates an update registration request of the presence data of the image delivery source user (here, user A), and transmits the request to the SIP/SIMPLE server 3 (step S331). Specifically, the conference A manager 53a generates a presence data update registration request to change data stored in the area 316 in the presence information storage area 3131 in the presence data storage 313a of the user A presence manager 31a to "Photo Sending", "in image delivery" or the like. Incidentally, in this embodiment, the PoC management server 5 has the supervisory authority for the SIP/SIMPLE server 3, and has the update authority for the presence data storage 313 in the user A presence manager 31a and the user B presence manager 31b.

The presence data manager 311a of the user A presence manager 31a in the SIP/SIMPLE server 3 receives the presence update registration request of the delivery source user from the PoC management server 5, and stores, as the presence data, "Photo Sending", "in image delivery" or the like into the presence data storage 313a in association with the presence ID ("State") relating to the received presence update registration request (step S333). The data stored in the area 316 in the presence information storage area 3131 in the presence data storage 313a of the user A presence manager 31a is changed to "Photo Sending", "in image delivery" or the like. Incidentally, in this example, it is assumed that the participants of the teleconference have registered other participants of the teleconference as the subscribers of the presence data whose presence ID is "State" in advance.

After that, the delivery processor 315a of the user A presence manager 31a in the SIP/SIMPLE server 3 notifies the user terminals A and B of the presence data whose presence ID is "State" according to the setting of the presence data storage 313a (step S335). The presence data processor 915 of the client application 91 in the user terminal B receives the presence data of the user A from the SIP/SIMPLE server 3, and displays the presence data on the display device (step S339). In addition, the presence data processor 915 of the client application 91 in the user terminal A receives the presence data of the user A from the SIP/SIMPLE server 3, and displays the presence data on the display device (step S337). Thus, in each user terminal, it is possible to grasp that the user A uploaded the image data.

Here, the user B operates the user terminal B and clicks the resource data for the image delivery to request the image data the user A uploaded. The image processor 916 of the client application 91 of the user terminal B transmits an image request to the resource for the image delivery (step S341). The step S341 may be executed without any intervention of the user B. The conference A manager 53a of the PoC management server 5 receives the image request from the user terminal B (step S343), reads out the image data relating to the request from the image data storage 535a, and delivers the image data to the user terminal B of the requesting source (step S345). The image processor 916 of the client application 91 of the user terminal B receives the image data from the PoC management server 5, and displays the image data on the display device (step S347). Thus, the image data the user A uploaded can be downloaded.

By carrying out such a processing, in response to the update of the presence data (presence data whose presence ID is "State) of the delivery source user, the user terminal of the delivery destination can download the image data by accessing the resource for the image delivery. In addition, for example, when another user who participates in the same teleconference registers the image data in the same resource in the image data storage 535a by overwriting, the presence data of another user is updated, and because other user terminals, which detect the presence update, access the resource for the image delivery in response to the update, the delivery of the image data can be easily carried out by using the presence technique while using the resource of the voice-based teleconference. In addition, the same resource in the image data storage 535a can be used.

In addition, after the step S345, the presence data representing the state of the user A may be returned to "Busy".

Incidentally, it is possible to replace the processing of this example, especially, the steps S331 to S339, with the following processing. That is, the conference A manager 53a of the PoC management server 5 generates an update registration request of the presence data whose presence ID is "Photo" or "PhotoUser", and transmits the request to the SIP/SIMPLE server 3 (step S331). Specifically, the conference A manager 53a generates the presence data update registration request to secure the delivery source resource (e.g. ftp://yyy.yyy.yyy.yyy/imagefromUserA.jpg) and to change the data stored in the area 3366 in the presence information storage area 3331 in the presence data storage 333a of the conference A presence manager 33a to "xxx.xxx.xxx.xxx: xxxx ftp://yyy.yyy.yyy.yyy/imagefromUserA.jpg" or the like. In addition, a presence data update registration request to change the data stored in the area 3367 in the presence information storage area 3331 in the presence data storage 333a of the conference A presence manager 33a to "UserA (Photo Sending), UserB" or "UserA (in image delivery), UserB" may be generated. A presence data update registration request to carry out both of them may be generated.

The presence data manager 331a of the conference A presence manager 33a in the SIP/SIMPLE server 3 receives the update registration request of the presence data whose presence ID is "Photo" or "PhotoUser" from the PoC management server 5, and stores, as the presence data, "xxx.xxx.xxx.xxx:xxxx ftp://yyy.yyy.yyy.yyy/imagefromUserA.jpg" or "UserA(Photo Sending), UserB" or "UserA (in image delivery), UserB" into the presence data storage 333a in association with the presence ID ("Photo" or "PhotoUser") relating to the received presence update registration request (step S333). The data stored in the area 3366 in the presence information storage area 3331 in the presence data storage 333a of the conference A presence manager 33a is changed to "xxx.xxx.xxx.xxx:xxxx ftp://yyy.yyy.yyy.yyy/imagefromUserA.jpg" or the data stored in the area 3367 is changed to "UserA(Photo Sending), UserB" or "UserA (in image delivery), UserB".

After that, the delivery processor 335a of the conference A presence manager 33a in the SIP/SIMPLE server 3 notifies the user terminals A and B of the presence data whose presence ID is "Photo" or the presence data whose presence ID is "PhotoUser" according to the setting of the presence data storage 333a (step S335). The presence data processor 915 of the client application 91 in the user terminal B receives the presence data for the aforementioned image delivery from the SIP/SIMPLE server 3, and displays the presence data on the display device (step S339). In addition, the presence data processor 915 of the client application 91 in the user terminal A receives the presence data for the aforementioned image delivery from the SIP/SIMPLE server 3, and displays the presence data on the display device (step S337).

Figure 28:
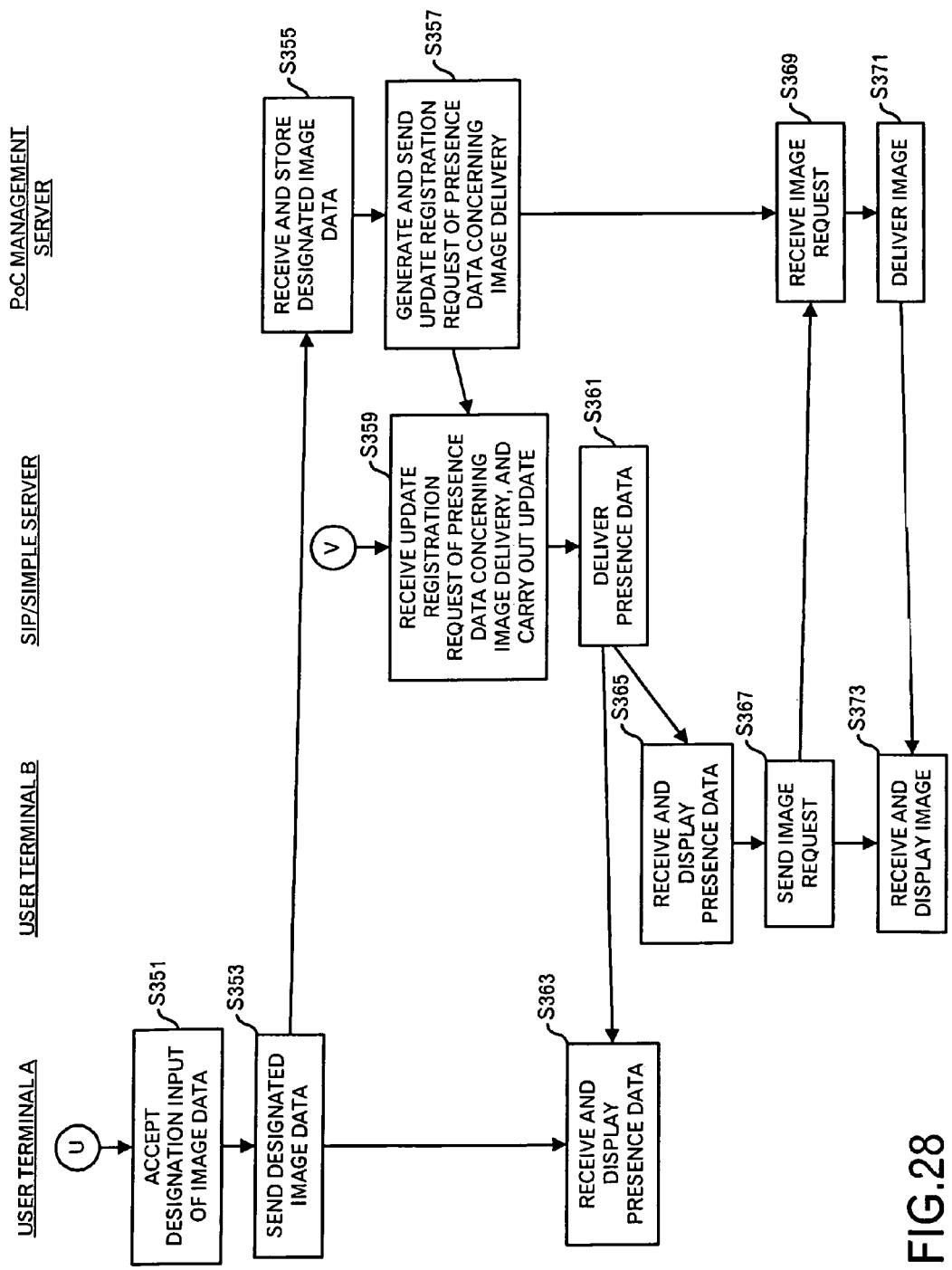
FIG. 28 is a diagram showing a second portion of the second processing flow of the image delivery processing in the embodiment of this invention.

Next, a processing flow according to a second example will be explained by using FIG. 28. Incidentally, the processing from the step S301 to the step S321 in FIG. 26 is almost the same as that in this example. However, the notification of the presence data for the image delivery in the step S319 is not transmitted to the user terminal B, which is not the user terminal of the image delivery source user. This may be realized by not registering the user ID of the user B in the disclosure setting request (proxy subscription request) in the step S315, for example, but transmitting the disclosure setting request (proxy subscription request) including the user ID of the user B to the conference A presence manager 33a of the SIP/SIMPLE server 3 from the conference A manager 53a of the PoC management server 5 after receiving the image data to be delivered, as explained later. In addition, it may be realized by including a setting so as to mask the user ID of the user B until the next update registration request of the presence data is received, in the disclosure-setting request (proxy subscription request) in the step S315. Thus, the resource data for the image delivery is notified to the user terminal A of the transmission source of the image delivery request.

Next, the user A of the user terminal A, which transmitted the image delivery request, operates the user terminal A to designate the image data to be delivered. The image processor 916 in the client application 91 of the user terminal A accepts the designation input of the image data from the user A (step S351), reads out the image data from the storage device of the user terminal A, and transmits the designated image data to the upload destination resource (IP address and port number) (step S353). The conference A manager 53a of the PoC management server 5 receives the image data from the user terminal A, and stores the image data into the image data storage 535a (step S355).

Then, the conference A manager 53a of the PoC management server 5 generates an update registration request of the presence data whose presence ID is "Photo", and transmits the request to the SIP/SIMPLE server 3 (step S357). Specifically, the conference A manager 53a generates the presence data update registration request to change the data stored in the area 3366 in the presence information storage area 3331 in the presence data storage 333a of the conference A presence manager 33a to "xxx.xxx.xxx.xxx:xxxx" (IP address and port number). Or, the conference A manager 53a may generate the presence data update registration request to separately secure the delivery source resource (e.g. ftp://yyy.yyy.yyy.yyy/imagefromUserA.jpg) in addition to the upload destination resource, and change the data stored in the area 3366 in the presence information storage area 3331 in the presence data storage 333a of the presence A presence manager 33a to "xxx.xxx.xxx.xxx:xxxx ftp://yyy.yyy.yyy.yyy/imagefromUserA.jpg" or the like.

The presence data manager 331a of the conference manager 33a in the SIP/SIMPLE server 3 receives the update registration request of the presence data whose presence ID is "Photo" from the PoC management server 5, and stores, as the presence data, "xxx.xxx.xxx.xxx:xxxx" or "xxx.xxx.xxx.xxx:xxxx ftp://yyy.yyy.yyy.yyy/imagefromUserA.jpg" into the presence data storage 333a in association with the presence ID ("Photo") relating to the received presence update registration request (step S359). The data stored in the area 3366 or the area 3367 in the presence information storage area 3331 in the presence data storage 333a of the conference A presence manager 33a is changed to "xxx.xxx.xxx.xxx:xxxx" or "xxx.xxx.xxx.xxx:xxxx ftp://yyy.yyy.yyy.yyy/imagefromUserA.jpg".

After that, the delivery processor 335a of the conference A presence manager 33a in the SIP/SIMPLE server 3 notifies the user terminals A and B of the presence data whose presence ID is "Photo" according to the setting of the presence data storage 333a (step S361). The presence data processor 915 of the client application 91 in the user terminal B receives the presence data from the SIP/SIMPLE server 3, and displays the presence data on the display device (step S365). In addition, the presence data processor 915 of the client application 91 in the user terminal A receives the presence data from the SIP/SIMPLE server 3, and displays the presence data on the display device (step S363).

Here, the user B operates the user terminal B, and clicks the resource data for the image delivery to request the image data the user A uploaded. The image processor 916 of the client application 91 of the user terminal B transmits an image request to the resource for the image delivery (step S367). Incidentally, the step S367 may be executed without any intervention of the user B. The conference A manager 53a of the PoC management server 5 receives the image request from the user terminal B (step S369), reads out the image data relating to the request from the image data storage 535a, and delivers the image data to the user terminal B of the requesting source (step S371). The image processor 916 of the client application 91 of the user terminal B receives the image data from the PoC management server 5, and displays the image data on the display device (step S373). Thus, the image data the user A uploaded can be downloaded.

By carrying out such a processing, in response to the registration of the image to the PoC management server 5, the presence data including the resource for the image delivery and the like is notified to the delivery destination user terminal. Therefore, each delivery destination user terminal can access the resource for the image delivery in response to the notification. In addition, when other users register the image data into, for example, the image data storage (it is possible to overwrite to the same resource.), the presence data whose presence ID is "Photo" is updated by the resource data for the delivery of the image data, and in response to the notification of the presence data whose presence ID is "Photo", other user terminals can download the image. Therefore, it is possible to delivery the image while using the resource of the voice-based teleconference.

Incidentally, it is possible to generate the presence data update registration request to change the data stored in the area 3367 in the presence information storage area 3331 in the presence data storage 333a of the conference A presence manager 33a to "UserA (Photo Sending), UserB", "UserA (in image delivery), UserB" or the like in the step S357. Furthermore, it is also possible to generate the presence data update registration request to update the presence data whose presence ID is "Photo" and the presence data whose presence ID is "PhotoUser".

Figure 29:
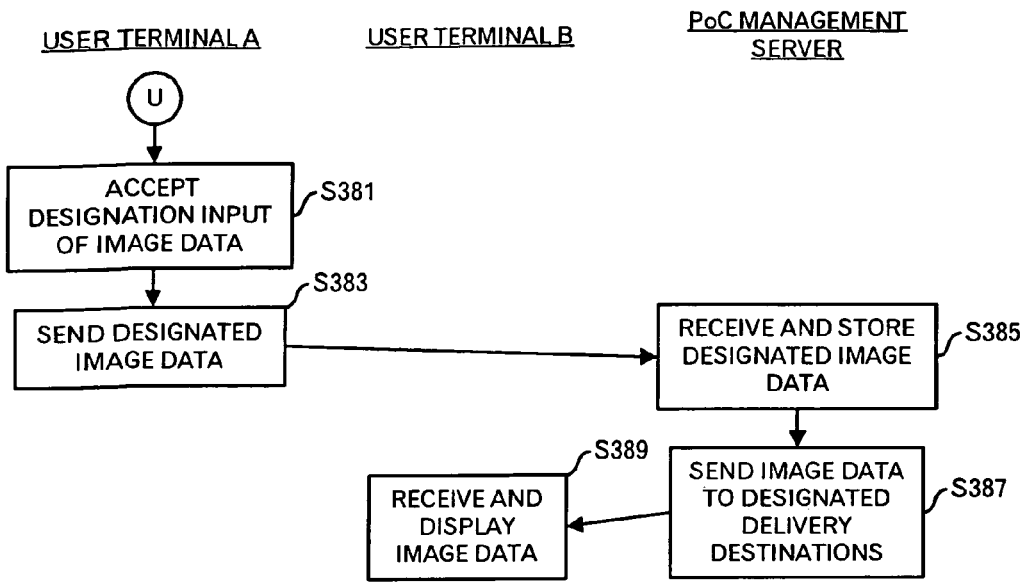
FIG. 29 is a diagram showing a second portion of the third processing flow of the image delivery processing in the embodiment of this invention.

Next, a processing flow according to a third example will be explained by using FIG. 29. Incidentally, as for the steps S301 to S323 in FIG. 26, the same processing is carried out.

The user A of the terminal A, which transmitted the image delivery request, operates the user terminal A to designate the image data to be delivered. The image processor 916 in the client application 91 of the user terminal A accepts the designation input of the image data from the user A (step. S381), reads out the image data from the storage device, and transmits the designated image data to the upload destination resource (IP address and port number) (step S383). The conference A manager 53a of the PoC management server 5 receives the image data from the user terminal A, and stores the image data into the image data storage 535a (step S385).

Then, the conference A manager 53a of the PoC management server 5 reads out the delivery destination user ID included in the image delivery request stored in the user data storage 533a, further identifies the IP address of the user terminal B from the delivery destination user ID, and transmits the image data stored in the image data storage 535a and received from the user terminal to the user terminal B (step S387). For example, the IP address corresponding to the user ID is obtained from the SIP/SIMPLE server 3. The image processor 916 of the client application 91 of the user terminal B receives the image data from the PoC management server 5, and displays the image data on the display device (step S389). By doing so, the user terminal B can receive the image data the user A uploaded.

As described above, by carrying out the processing shown in FIGS. 26 to 29, it becomes possible to separately carry out the communication of the image data in the subset of the participants of the voice-based teleconference while maintaining the voice-based teleconference. Incidentally, because the delivery of the image data is realized by using the presence technique, the resource prepared for the voice-based teleconference can be effectively utilized.

Although one embodiment of this invention was described above, this invention is not limited to this. The functional block diagrams shown in FIGS. 1 to 4 are mere examples, and there is a case where they are not always identical with the actual program module configurations. Furthermore, as for the method of holding the data, which is shown in FIGS. 5 to 13, it is possible to adopt other methods as far as the similar data can be managed.

Figure 30:
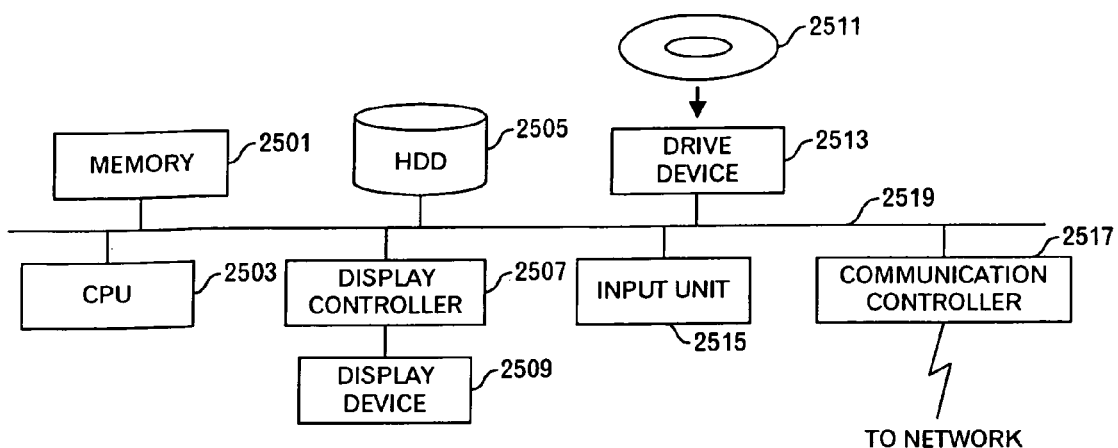
FIG. 30 is a functional block diagram of a computer.

Incidentally, the SIP/SIMPLE server 3, the PoC management server 5 and the PoC-MCU server 7 are computer devices as shown in FIG. 30. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 30. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described below in details are realized.

In addition, the user terminal is also represented by a similar configuration by providing the storage device such as a flash memory instead of the HDD 2505 and the drive device 2513.

In addition, as for the step S115 of FIG. 20, a configuration was explained in which the presence registration request of the participants is transmitted for each participant from the PoC management server 5 to the SIP/SIMPLE server 3. However, it is possible to adopt a configuration in which without immediately transmitting the presence registration request of the pertinent participants during a first predetermined time by the conference A manager 53a of the PoC management server 5 even when receiving the participation response, the participation responses received during the predetermined time are grouped to transmit the presence registration request of the pertinent participants. During the first predetermined time, the possibility that plural participants reply the participation response is high. Therefore, a lot of presence registration requests of the participants are transmitted, and the update of the presence data is frequently carried out. In addition, when the update of the presence data is frequently notified to the user terminal, the communication bandwidth in the wireless section is wasted. Then, by grouping the participation requests during the predetermined time as described above, the communication volume between the SIP/SIMPLE server 3 and the user terminals is reduced and the response becomes earlier. Incidentally, after the predetermined time elapsed, for each receipt of the participation response, the step S115 and subsequent steps can be executed.

Figure 22:
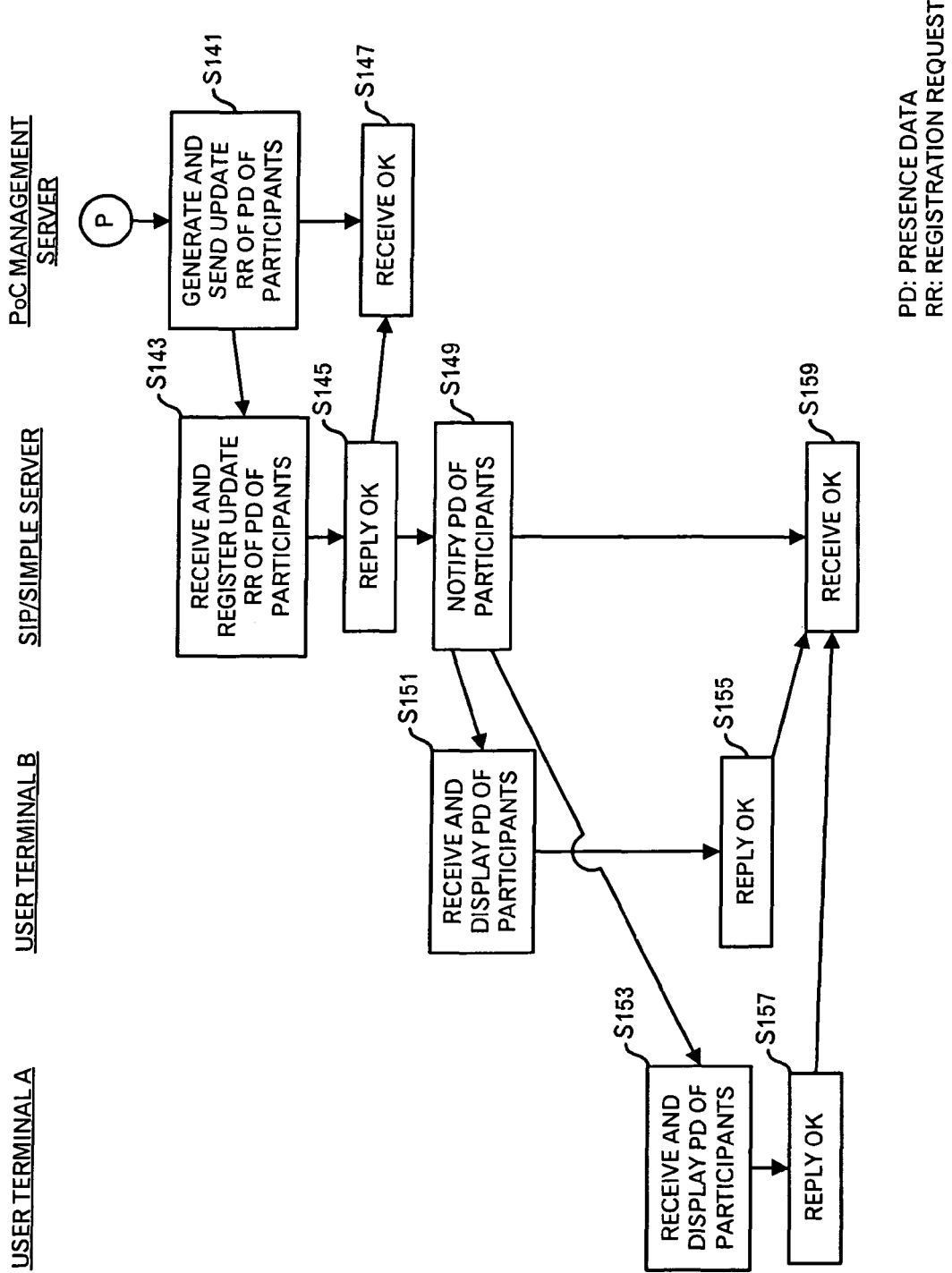
FIG. 22 is a diagram showing a ninth portion of the processing flow according to one embodiment of this invention.

In addition, as for the step S241 of FIG. 22, the similar matter is also applied.

Furthermore, the processing was explained in which the PoC management server 5 carries out the proxy subscription request on behalf of the user. However, if it is obvious, the PoC management server 5 or the SIP/SIMPLE server 3 may automatically change the subscription relations also in other cases.

In addition, in the processing of FIGS. 26 to 29, the calling processing of the chat may be applied. In such a case, the processing from steps S201 to S267 may be carried out as the calling processing for the image delivery.

In addition, the image data relating to the image delivery may be a static image or moving image. In addition, other file can be delivered, similarly.

What is claimed is:

1. A communication method executed by a participant terminal of a teleconference, comprising:
   first receiving information concerning a resource for image data delivery, wherein said information, which is managed as first presence data, is delivered from a server when said server receives an image delivery request from a terminal of a first participant of a voice-based teleconference, and said first presence data is delivered to subscribers when updated;
   second receiving second presence data concerning a state of said first participant, wherein said second presence data is delivered from said server when image data corresponding to said image delivery request is stored from said terminal of said first participant to said server, and said second presence data represents that said image data is ready to be delivered from said resource;
   transmitting a request for said image data to said resource by using said information received at said first receiving, after said second receiving; and
   third receiving said image data from said resource, after said transmitting.

2. A portable terminal, comprising:
   a memory; and
   a processor configured to execute a procedure by using the memory, the procedure comprising:
   first receiving information concerning a resource for image data delivery, wherein said information, which is managed as first presence data, is delivered from a server when said server receives an image delivery request from a terminal of a first participant of a voice-based teleconference, and said first presence data is delivered to subscribers when is updated;
   second receiving second presence data concerning a state of said first participant, wherein said second presence data is delivered from said server when image data corresponding to said image delivery request is stored from said terminal of said first participant to said server, and said second presence data represents that said image data is ready to be delivered from said resource;
   transmitting a request for said image data to said resource by using said information received at said first receiving, after said second receiving; and
   third receiving said image data from said resource after said transmitting.

* * * * *